Aug. 15, 1961 E. V. BUNTING 2,996,124
POWER OPERATING AND CONTROL SYSTEM FOR TRACTORS
Filed Aug. 20, 1954 11 Sheets-Sheet 7

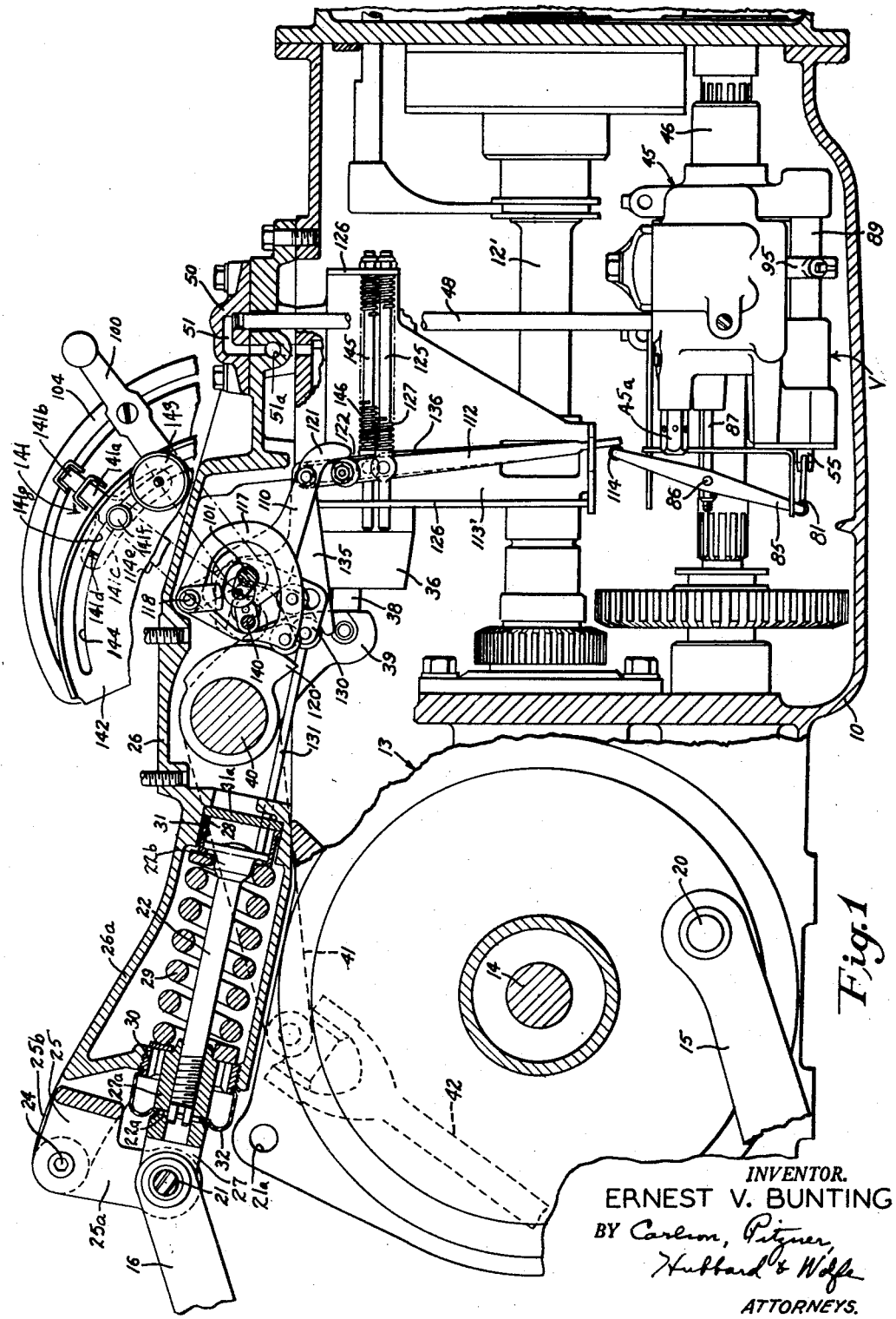

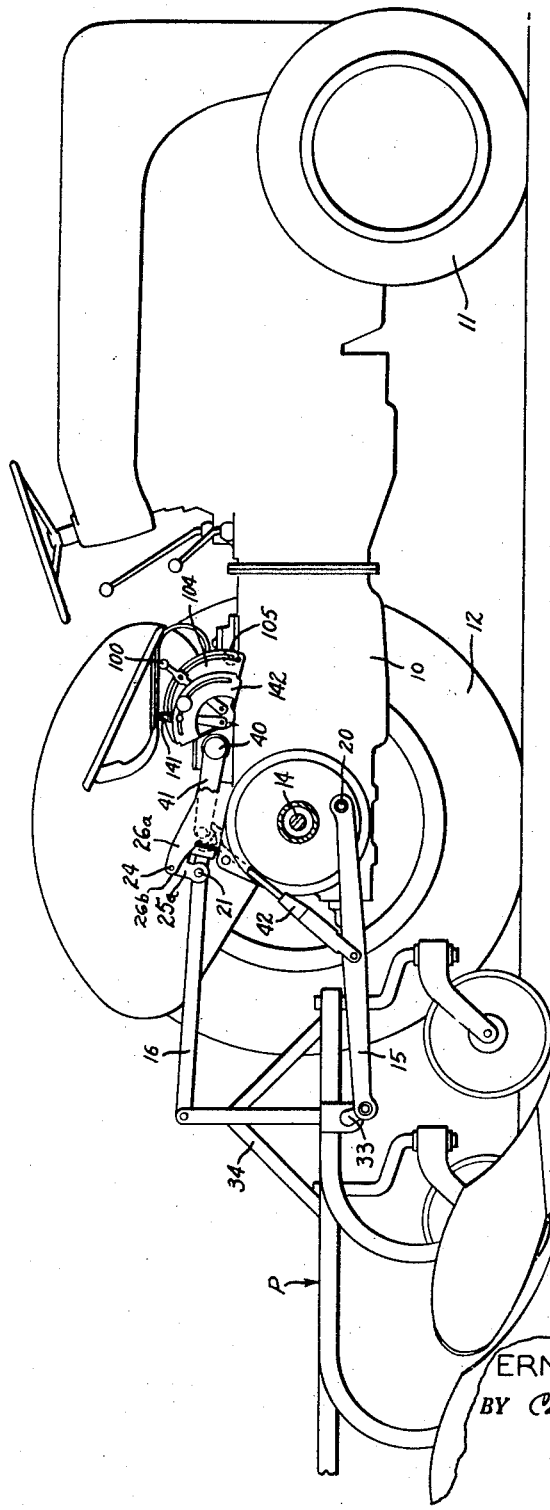

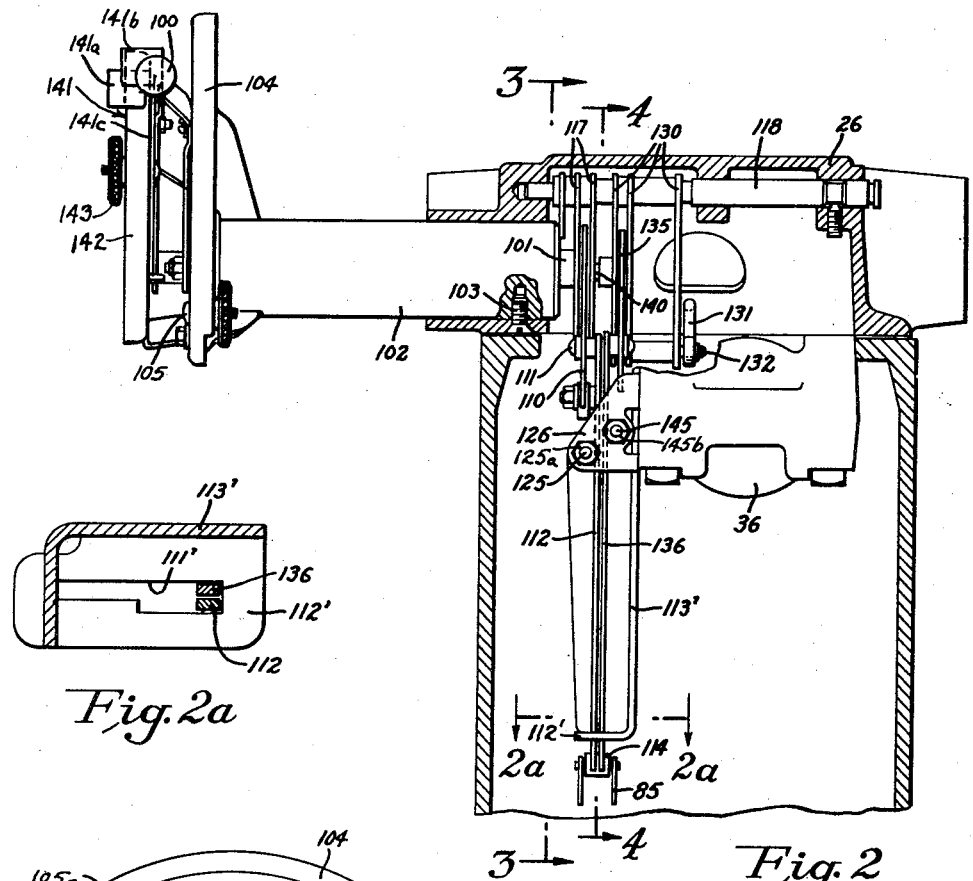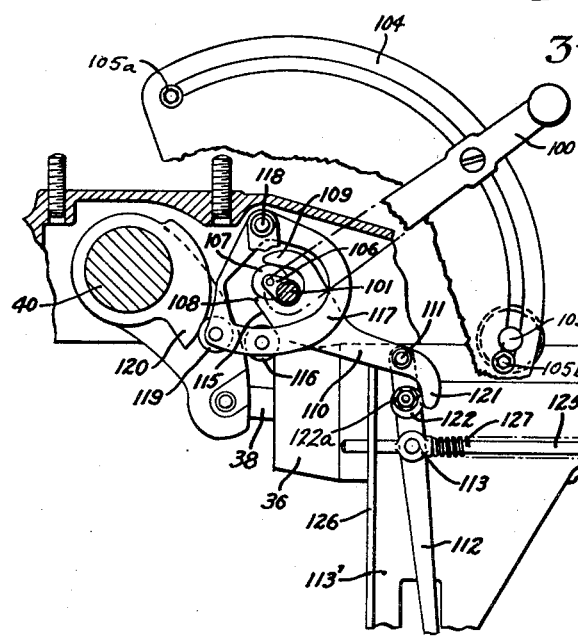

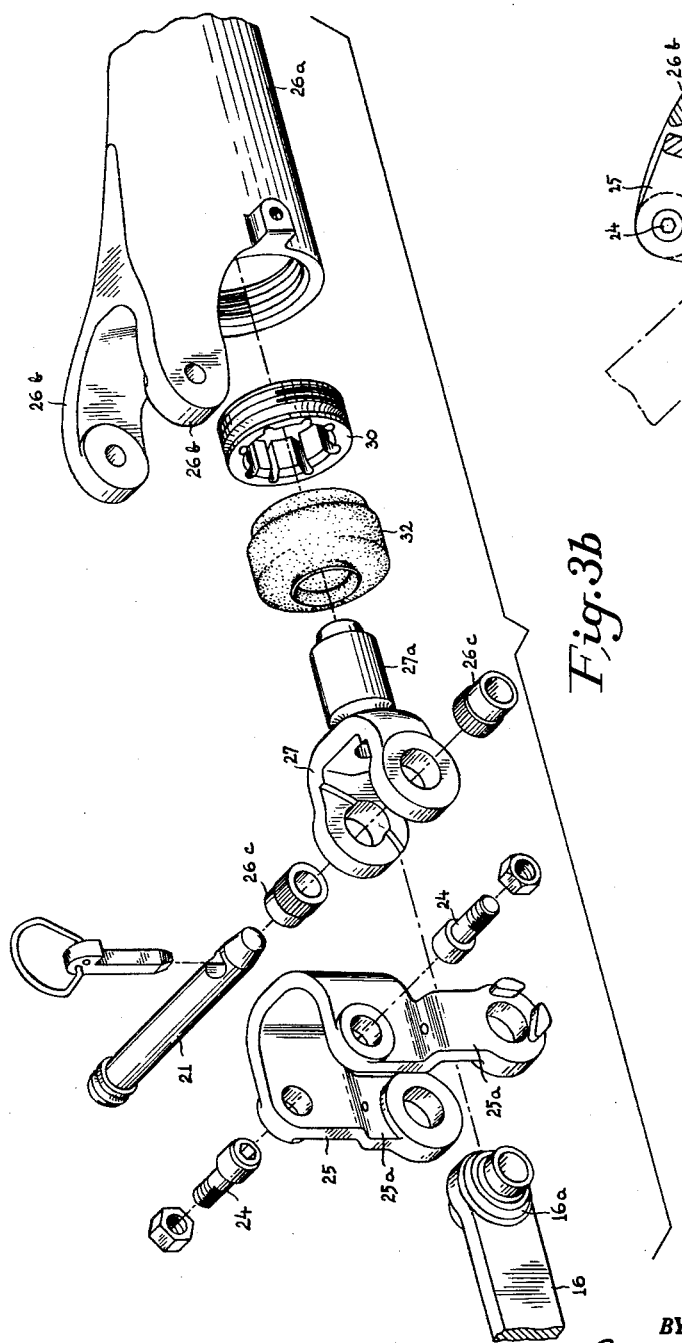
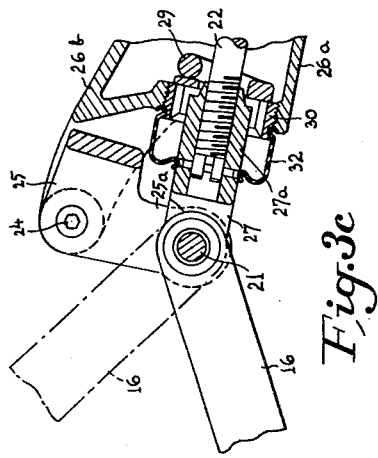

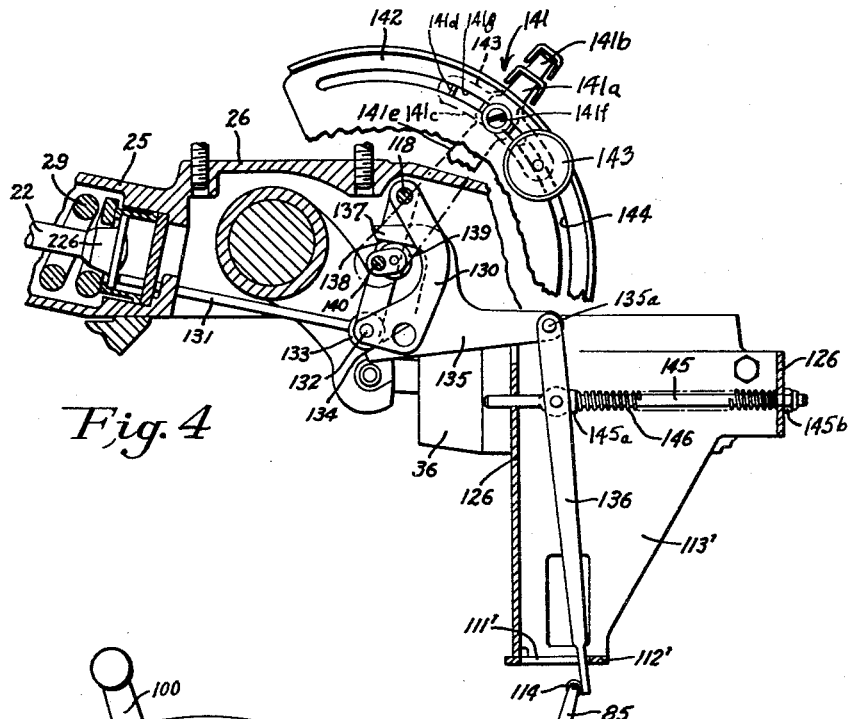
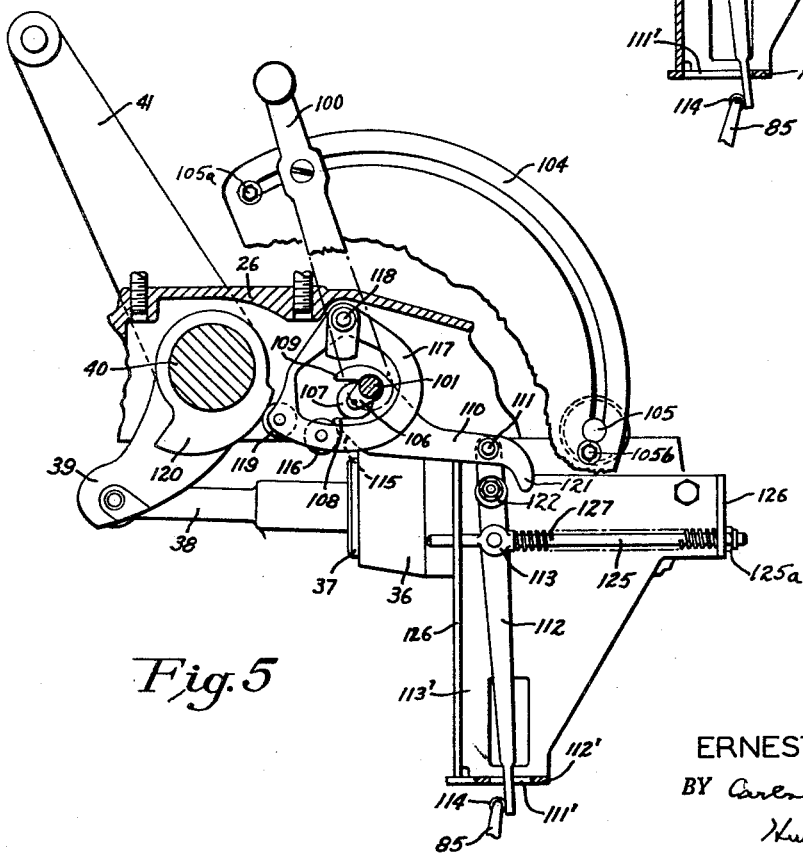

INVENTOR.
Ernest V. Bunting
BY
Carlson, Pitzner, Hubbard & Wolfe
Attorneys

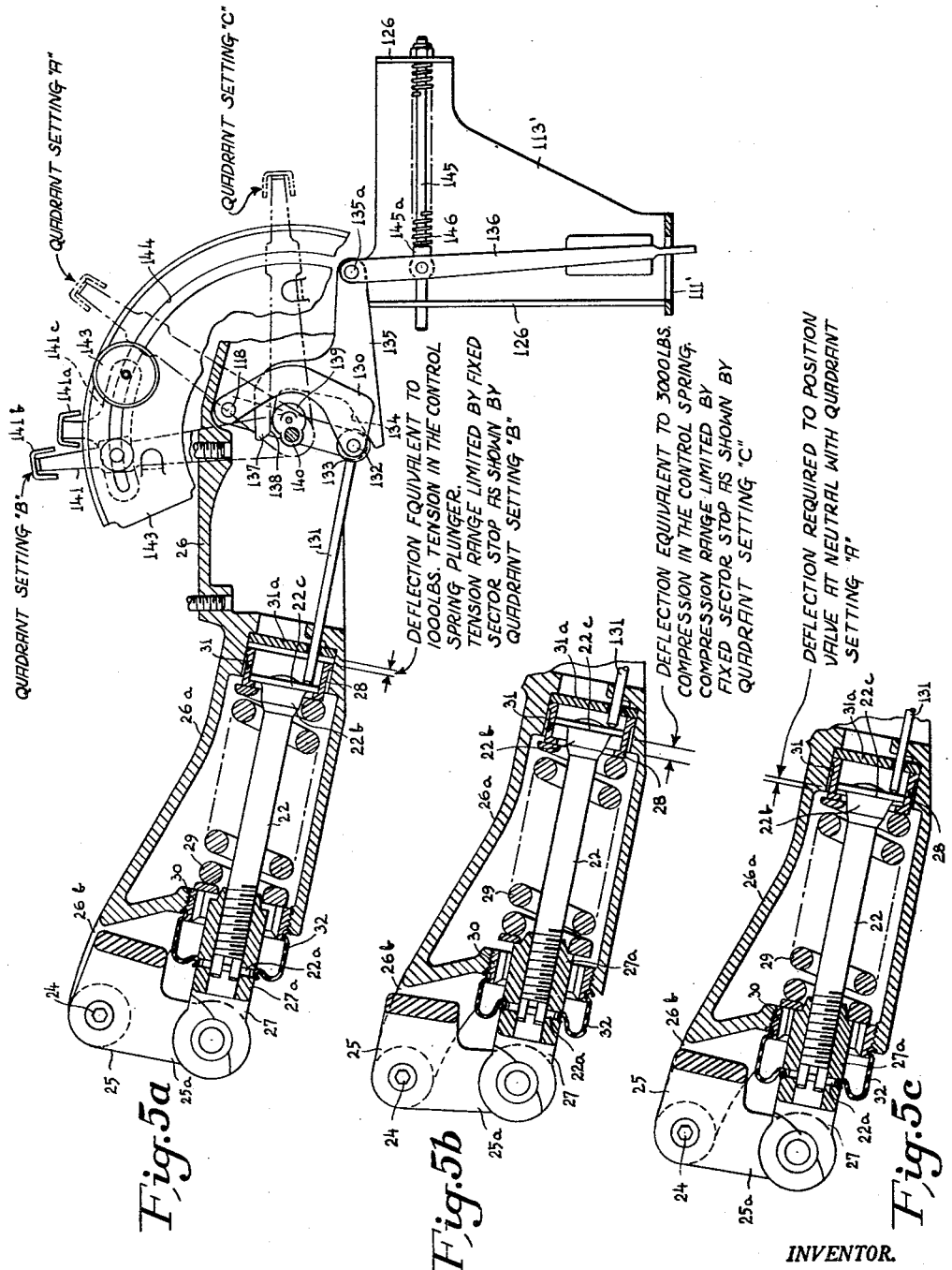

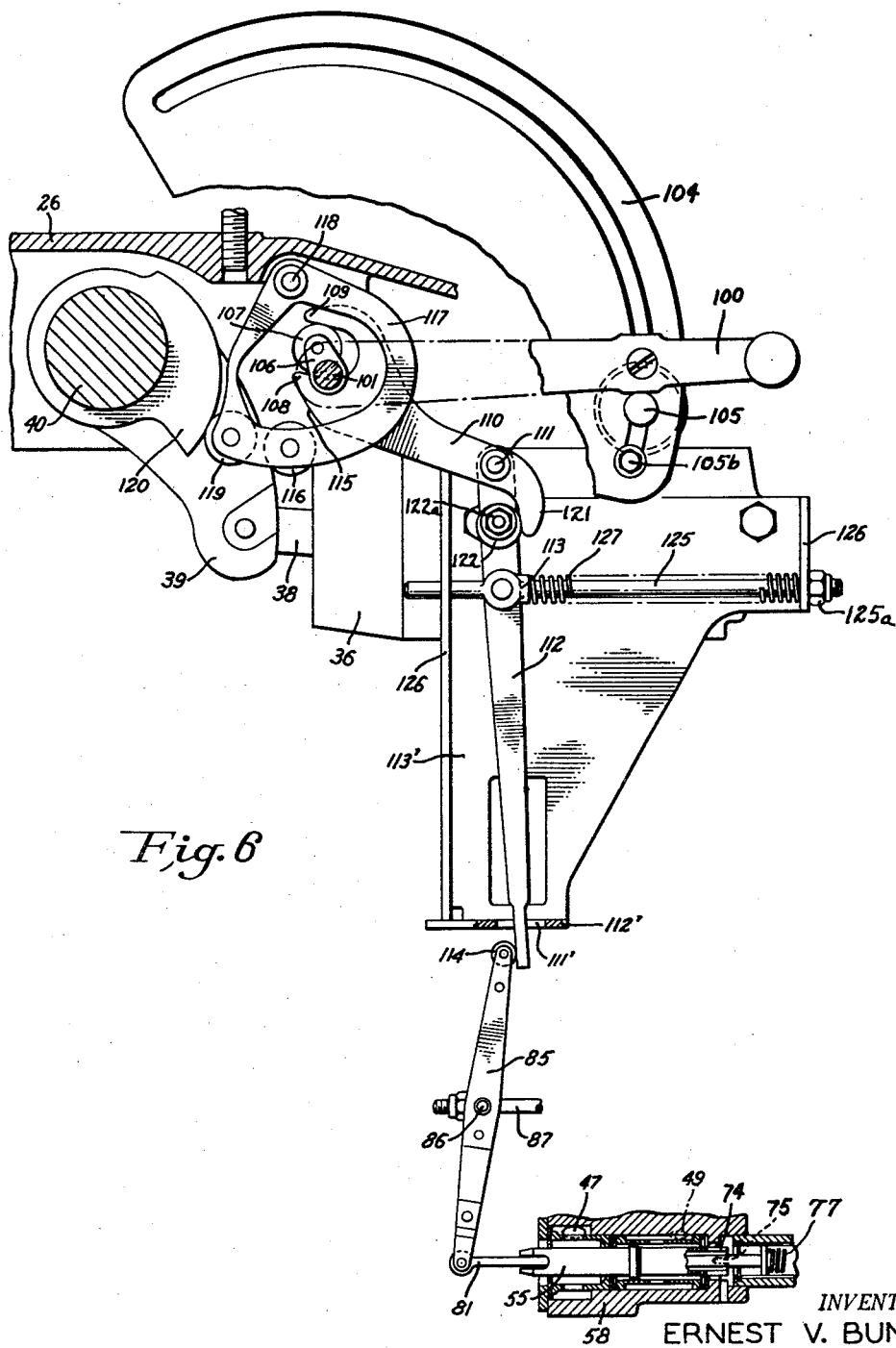

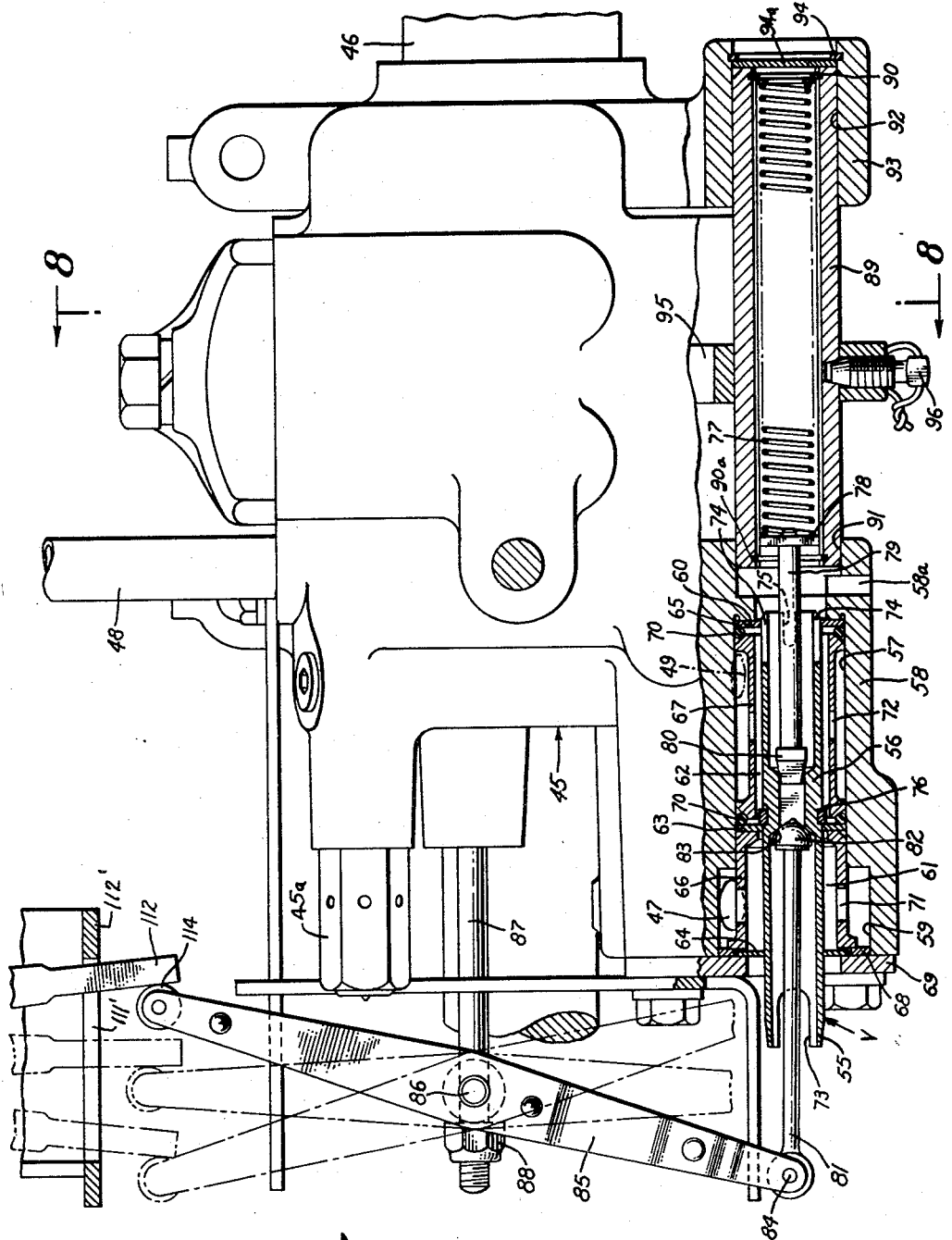

Aug. 15, 1961 E. V. BUNTING 2,996,124
POWER OPERATING AND CONTROL SYSTEM FOR TRACTORS
Filed Aug. 20, 1954 11 Sheets-Sheet 11

INVENTOR.
ERNEST V. BUNTING
BY Carlson, Pitzner,
Hubbard & Wolfe
ATTORNEYS.

United States Patent Office 2,996,124
Patented Aug. 15, 1961

2,996,124
POWER OPERATING AND CONTROL SYSTEM FOR TRACTORS
Ernest V. Bunting, Detroit, Mich., assignor to Massey-Ferguson Inc., a corporation of Maryland
Filed Aug. 20, 1954, Ser. No. 451,276
18 Claims. (Cl. 172—9)

The invention relates to controls for hydraulic systems and more particularly to hydraulic systems of the type provided in tractors for raising and lowering attached implements and for regulating their working depths. The present application is a continuation-in-part of my copending application, Serial No. 418,057, filed March 23, 1954, now abandoned.

The mounting of ground working implements on tractors for operation therewith as a unit was made practicable by the development of a hydraulically elevatable hitch with controls adapted to respond to the draft load on the implement and maintain the same at a substantially constant working depth (see the system disclosed in Ferguson Patent No. 2,118,180, issued May 24, 1938).

The above mentioned tractor hydraulic system was originally designed with a size of control spring and other parts suited for handling a two furrow plow. In the course of time, however, forms of practically every type of ground working implement used in farming as well as many other types of farm machines, have been devised for at least attempted operation with the hydraulically elevatable hitch.

The association of such diverse types of implements with the tractor introduced problems because, among other factors, of the disparities in draft loads, weight, suck and side draft in various implements. Additional limitations of earlier forms of controls have appeared with increase in tractor power and attempted adaptations of the controls for operation with larger and heavier implements. Tractor hydraulic systems as presently constructed or proposed when used with heavy implements tend to over-run when adjusting working depth to correct deviations from the draft load at which the implements are intended to operate. This reduces the effectiveness of the draft control and also causes bobbing of the tractor which is objectionable for obvious reasons.

One general aim of the present invention is to provide a novel system capable of accommodating a range of implements varying in weight, size, draft load and other characteristics far beyond what can now be accommodated.

More particularly, it is an object of the present invention to provide a control system which eliminates the need for selection between any so-called "position" and "draft" control and which affords full and accurate positional control of the implement when it is being raised or lowered and in which control of the working depth is taken over at the proper time and automatically maintained by preset mechanism incorporated in the controls.

Another object is to provide a system in which the controls have a "natural feel," that is, one in which the movements of the coupled implement are co-ordinated with those of the control lever both as to direction and rate until the implement has reached its desired working depth whereupon control becomes entirely automatic.

Another object is to provide a control system which may be set for what amounts to a desired working depth in a very simple and expeditious manner while the driver is watching the actual working of the implement.

Still another object is to provide a control system which can be used for corrective adjustment of the rate of response of the system and which would otherwise be altered by changes introduced by the various weights and drafts of various implements. Moreover, such adjustment is preferably accomplished by means of the same lever used to control the raising and lowering of the implement.

A more specific object is to provide a control system which is readily adjustable to provide for lowering the hitch at any desired rate while the attached implement is in working position irrespective of the gravity load on the hitch and without affecting the rate at which the hitch is raised by the power unit.

A further object is to provide a control system in which changes in implement working depth in either direction are effected very smoothly and accurately with a minimum of overcorrection irrespective of the extent of the changes or the weight or draft of the implement.

A still further object is to provide a control system affording both draft and position control and embodying improved means for automatically interrupting or substantially reducing the tractive effort of the tractor before any damage is done when the implement strikes an obstruction.

Other objects and advantages of the invention will become apparent from the following detailed description of the preferred embodiment illustrated in the accompanying drawings, in which:

FIGURE 1 is a longitudinal sectional view through the center housing of a tractor equipped with a hydraulically elevatable implement hitch and a control system embodying the features of the invention.

FIG. 1a is a side elevational view of the tractor with an implement coupled to it. The near, rear wheel of the tractor is cut away to better show the hitch, and the rear portion of the implement (a three-bottom plow) has also been broken away.

FIG. 2 is a fragmentary transverse sectional view taken in a vertical plane forwardly of the valve actuating levers.

FIG. 2a is a fragmentary sectional view taken in a plane substantially on the line 2a—2a of FIG. 2.

FIG. 3 is a fragmentary sectional view taken in a plane substantially on the line 3—3 of FIG. 2 showing details of the control mechanism.

FIG. 3b is an exploded perspective view showing the manner in which the top link, rocker and control plunger are interconnected.

FIG. 3c is a fragmentary sectional view showing the relationship between the control plunger and the top link in the upper and lower limit positions of the latter.

FIG. 4 is a sectional view taken in a plane substantially on the line 4—4 of FIG. 2 showing another portion of the control mechanism.

FIG. 5 is a fragmentary sectional view similar to FIG. 3 showing the elements of the control mechanism set for maintaining a coupled implement in transport position.

FIG. 5a is a stop motion sectional view showing the condition of the control spring assembly when subjected to a tension load of 1,000 lbs.

FIG. 5b is a view similar to FIG. 5a showing the condition of the control spring assembly when subjected to a 3,000 lb. compression load.

FIG. 5c is a view similar to the preceding two figures showing the condition of the control spring assembly substantially at the point of transition from tension to compression loading.

FIG. 6 is a fragmentary sectional view similar to FIGS. 3 and 5 showing the elements of the control mechanism in another adjusted position.

FIG. 7 is a longitudinal sectional view of the control valve constituting an element of the control system.

Figure 3A:
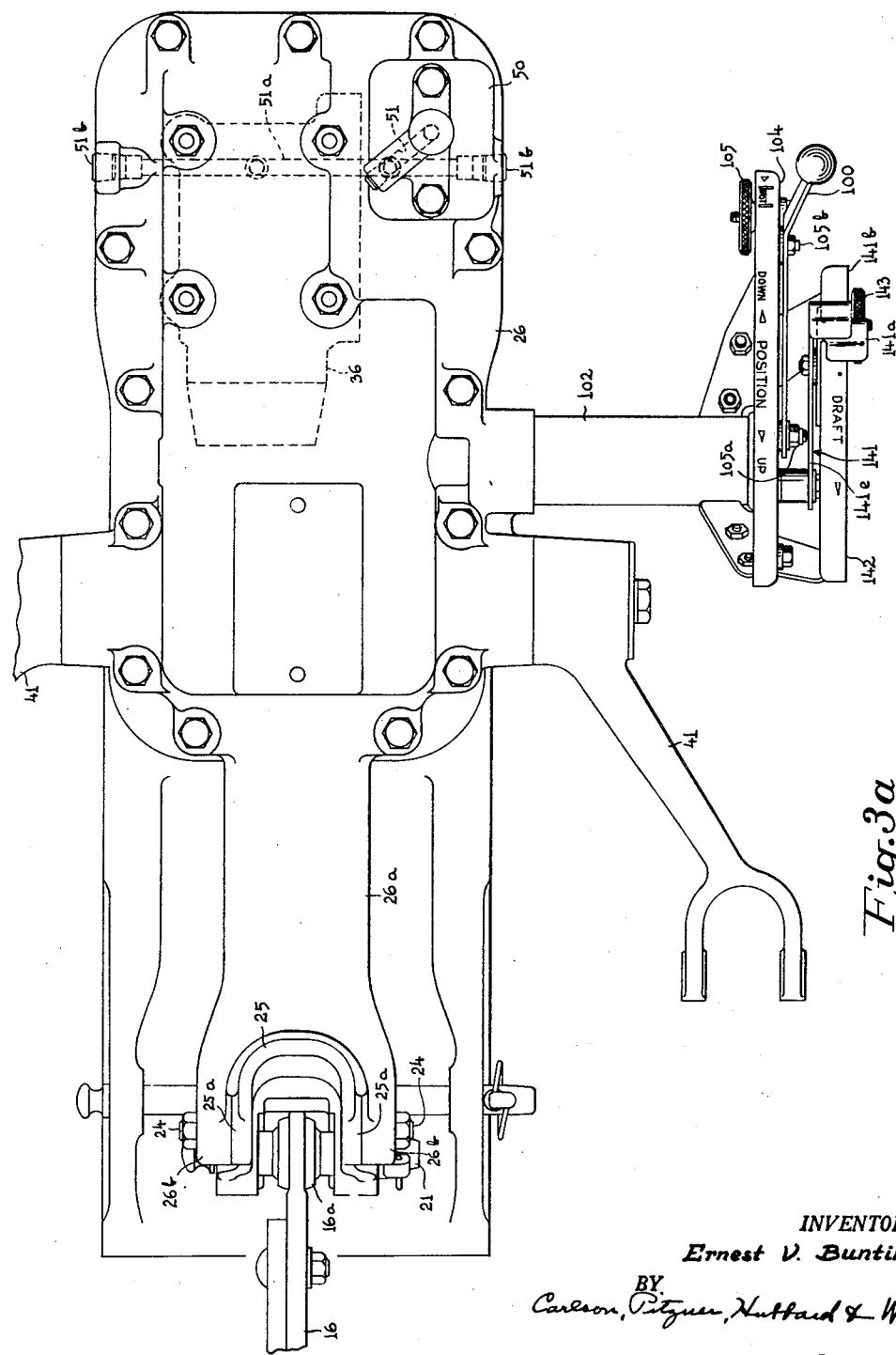
FIG. 3a is a top view of the rear portion of the tractor center housing with the cover plate assembly in position thereon.

For purposes of illustration, a single preferred embodiment of the invention has been shown and will be described herein in some detail. It is to be understood, however, that it is not intended that the detailed character of the disclosure should limit the invention to such particulars. On the contrary, it is intended to cover all equivalents and alternative arrangements falling within the spirit and scope of the invention as it is more broadly and generally characterized in the appended claims.

*General tractor organization*

The overall appearance and organization of the illustrated tractor (FIG. 1a) will be familiar to those skilled in the art as that of the "Ferguson" tractor. It has been here equipped with the novel hydraulic control system for implements which is about to be described.

The tractor shown has a center housing 10, which together with the engine and central gear box for a speed-change gearing (not shown), constitute the backbone of the frameless tractor body. Pneumatic tired pairs of front and rear wheels 11 and 12 are provided. The front wheels afford steering. The rear wheels are driven from the tractor engine through change-speed gearing by way of a power delivery shaft 12′, a differential 13 and axle shafts 14 (FIG. 1).

The exemplary tractor is equipped with a so-called three-point implement hitch, familiar on "Ferguson" tractors and including a pair of lower or draft links 15 and an upper or top link 16. The draft links 15 are arranged in trailing relation to the tractor and to converge forwardly. At their forward ends the links are pivoted as at 20 on the rear portion of the tractor housing to swing vertically about a transverse horizontal axis located below and slightly forward of the axis of the axle shafts 14 for the tractor drive wheels. The pivots 20 permit lateral swing of the draft links as well as vertical swing.

Swivelly mounted balls are provided at the rear ends of the three draft links 15 and 16 for disengageable connection with any desired ground working or other implement to be coupled to the tractor. By way of example, the tractor has been shown in FIG. 1a with a mold board plow P attached to the linkage. It will be observed that the lower draft links receive pins or studs on a cross-shaft 33 at the forward end of the plow beam. Top link 16 is connected to the upper end of an A-frame 34 rigid with the implement structure so that forward tilting of the implement due to the soil reaction on its ground engaging parts is transmitted through the top link to a spring biased control plunger on the tractor which will be described shortly.

Alongside the driver's seat is a hand control or quadrant lever 100. Hydraulic power mechanism controlled by this lever effects raising and lowering of the hitch linkage and such implement as it may be carrying.

*Hydraulic power mechanism*

Raising of the lower draft links 15 is effected through the medium of a hydraulic power mechanism or unit which is powered from the tractor engine. Various forms of hydraulic actuators or motors are known in the art. In the illustrative installation a so-called one-way ram has been selected. It comprises a cylinder 36 bolted or otherwise rigidly secured to the underside of a cover plate 26 for the center housing. The cylinder opens to the rear and slidably receives a piston 37 (FIG. 5) having a piston rod 38 projecting rearwardly therefrom. The ball-shaped outer end of the piston rod is received in the socketed lower end of an arm 39 rigid with a transverse rock shaft 40 journaled in the upper rear portion of the tractor body, in this instance, in the cover plate 26. The ends of the rock shaft 40 project at opposite sides of the cover and each end has a crank arm 41 splined on it and connected to one of the lower draft links by a drop link 42.

The arrangement is such that when pressure fluid (such as oil) is supplied to the closed end of the cylinder 36, the piston 37 is forced rearwardly to rock the arms 41 upwardly and thus raise the lower draft links 15. Similarly, upon exhaust of the fluid from the cylinder, the piston 37 is permitted to retreat into the cylinder under the urging of the gravity load of the links 15 (and any implement attached to them) so that the links swing downward in a lowering direction.

The volumetric rate at which oil is supplied to, or exhausted from, the ram cylinder 36 will, accordingly, determine the rate at which the draft links 15 are raised or lowered. In the present instance pressure fluid is supplied from a positive displacement pump 45 (FIGS. 1, 7 and 8) located in the center housing below the ram. The lower portion of the housing is flooded with oil, constituting a sump for the system. Oil enters the pump through an intake passage 47 (FIG. 7) cored in the pump casing and is discharged from the pump through a conduit 48 leading to the closed end of the cylinder 36. A spring loaded safety valve 45a relieves the high pressure side of the pump when excessive pressure is reached.

Such pump as is selected may be driven from the tractor's engine in various ways. In the illustrative installation the pump 45 is driven from the engine through a pump and power take-off drive shaft 46 independently of the change-speed transmission although, of course, other drive connection arrangements are available (see for example Ferguson U.S. Patents Nos. 2,118,180 and 2,223,-002). With a pump driven by an engine whose speed must necessarily vary because of other demands made on it in the tractor, provision must be made for controlling the volumetric delivery rate of oil from the pump independently of pump speed. Various expedients for that general purpose are known in the art. The one chosen for employment here in the particular exemplification of the invention illustrated is to vary the amount of oil permitted to enter the pump (and hence, correspondingly, the amount of oil delivered from it).

*Characteristics of controls*

Pursuant to the present invention provision is made so that by swinging the quadrant lever 100 up and down a great variety of implements may be controlled smoothly and easily and with a fidelity and scope of response heretofore unrealized.

Tractors have heretofore been provided (see Ferguson U.S. Patent No. 2,118,180) in which an implement on such a hitch as that here shown could be lifted or lowered between transport and working position by simply swinging a quadrant lever. Moreover, when once lowered, soil reaction on the implement (draft load) was used to maintain automatically a draft load selected by setting of the quadrant lever. In such a draft control system (or depth control system as it is sometimes called) control of hitch position was difficult and unreliable in the range between transport and grounded positions. Proposals have heretofore been made for using in lieu of such a "draft control" system, a true follow-up or "position control" type of system in which the hitch links follow at all times the position of a quadrant lever. Useful as they may be for operating cranes, loaders and various other implements, they have vital deficiencies with soil working implements. For with position control the advantages of free fore-and-aft articulation between tractor and implement, and which are present in draft control, are largely lost. Moreover, proposals have heretofore been made for the driver to shift a selector lever to condition a system alternatively for position control or for draft control. That, however, demands skill and attention in judging the conditions suited for one or the other and can lead to poor performance through failure to make the proper selections.

The presently disclosed system proceeds on a basically new concept. Pursuant to it, transition from "position" control to "draft" control, and vice versa, are accomplished automatically and as conditions require without necessity for conscious selection or volition on the part of the driver. So subtly and smoothly does the transition take place that the driver has no need to concern himself with it at all, is usually not even aware of it. The implement simply goes, and stays, where he expects it to go when he shifts the quadrant lever.

In addition, the presently disclosed system is able to accommodate a far wider range of sizes of implements, all with smooth, effective control, than predecessor systems could do. How it does so, and the preferred mechanisms employed, are described below.

*Control valve mechanism*

A novel form of control valve mechanism V appears in FIG. 7, being located in the lower portion of the pump housing. Its function is to meter fluid into or out of the system, or block it altogether. Special precautions have been exercised in this valve mechanism to avoid binding and sticking of the parts so that high fidelity operation will be insured under even the most trying field conditions.

The illustrated valve mechanism comprises an axially slidable plunger 55. It is generally tubular in shape with an interior, central enlargement or partition through which extends an axial opening of square cross-section. The plunger may be machined from bar stock and suitably hardened, being made to very accurate dimensions. This plunger is slidably received in a pair of hardened, accurately fitted steel rings 63, 65 which define the opposite ends of a high pressure chamber 62. A third ring 64, coacts with the central ring 63 to define the opposite ends of a second or low pressure intake chamber 61. This third ring 64 is, however, free to float trans-axially within the confines of an outer ring 68. The nose of the plunger 55 adjacent the floating ring 64 is tapered so that it can enter the ring freely as it passes in and out of it, centering the ring as it does so. Accordingly, accurate concentricity of mounting is required for only a pair of rings (63, 65) rather than for a set of three which would be a far more difficult task.

By using rings, such as shown, to constitute the lands at opposite ends of chambers through which the plunger 55 passes, liability to sticking and malfunction of the plunger are minimized. The contact areas of the rings with the plunger being of short axial length, they can be formed with greater accuracy (to tolerances of a few ten thousandths of an inch) and less liability to ovaling or other faults in shape than would be the case with a bushing or sleeve bored to receive the plunger.

Spacing sleeves 66, 67 are interposed between the rings 64, 63 and 63, 65 respectively. Being completely out of contact with the plunger 55, their interior bores need not be of any great accuracy either as to size or straightness. The sleeve 66 has large ports 71 for free passage of oil from the chamber 61 into the annular space surrounding the sleeve and thence into the pump's intake passage 47. Likewise, the other sleeve 67 has large ports 72 for unrestricted flow of oil into high pressure chamber 62 from the pump's discharge passage 49. The latter is cored in the pump housing and communicates with the conduit 48.

The rings 63, 64, 65 with their interposed spacer sleeves 66, 67 are held in assembled or stacked relation as shown (FIG. 7), within a suitable bore in the pump housing, by a cover plate 69 bolted to the housing. Sealing at the ends of the high pressure chamber 62 is also insured by elastic O-rings 70 interposed between the flanged ends of the sleeve 67 and the adjacent faces of the steel rings 63, 65. The whole assembly is pressed by the cover plate 69 against a shoulder 60 at the inner end of the housing bore.

In its central or neutral position imperforate surface portions of the plunger 55 bridge between the rings 63, 65 and 63, 64. Consequently, entry of oil into the intake chamber 61 and exit of oil from the high pressure chamber 62 are both prevented. In such condition fluid is locked in the system and the ram piston remains stationary.

As the valve plunger 55 is slid axially rearward (leftward in FIG. 7) from such neutral position, there is a progressive uncovering of a pair of narrow, axially extending slots, 74. As these slots pass under the ring 65 greater and greater slot area is opened to the high pressure chamber 62. Accordingly, as soon as these slots or "drop" ports begin to open in that fashion high pressure oil spurts through them from the chamber 62, passes into the interior of the plunger and then freely through a passage 58a back into the sump. Such bleeding of fluid from the system permits the ram piston to retreat into the cylinder, lowering the hitch links 15.

The rate of such lowering depends upon the rate at which oil can escape to the sump. By using slots 74 of long, thin shape, as shown, for such drop or escape ports, the rate, can be controlled with great nicety in sliding the plunger back and forth to vary the area of slot exposed.

A second pair of slots 75, shorter and wider than the slots 74, are also provided at the "drop" end of the plunger 55. When the plunger has moved far enough rearward that these slots 75 begin also to be exposed the rate of oil escape abruptly increases. A fast dumping of the system ensues. The advantage of such wide scope and control of drop rates in connection with various implements will later appear.

Abutment against the central ring 63 by the shouldered left end of a stop collar 76 (seated in a groove girdling the central portion of the plunger) limits the rearward travel of the plunger. Such limit position is one in which the plunger is still guidingly received in the accurately fitted ring 65. The stop collar 76 likewise abuts against the ring 65 to limit travel of the plunger in the opposite or forward direction. In such limit position (see FIG. 9) however, the plunger has left the ring 64, but can readily re-enter it because that ring is free floating.

As the plunger moves forward from its neutral position the high pressure chamber 62 remains closed. But a pair of large slots 73 pass under the ring 64, establishing intake for the pump. As these slots 73 are so uncovered, oil passes (from the surrounding body of oil in the sump and in which the mechanism is immersed) through the slots into the chamber 61, through the large ports 71 and thence into the intake passage 47. Oil so taken in is delivered by the pump to the ram cylinder, raising the hitch links 15. The functioning of the valve for overload release purposes, and in which the plunger 55 travels to extreme forward position, will later be described.

As herein shown, the plunger 55 is yieldably urged toward its rearward or "drop" position by a compression spring 77 acting between a fixed abutment and a head 78 on the inner end of a push rod 79 operatively connected with the plunger. The operative connection, in this instance, is provided by a head 80 of truncated pyramid shape mating with the passage of square cross-section in the central partition 56 of the plunger.

For shifting the valve plunger against the bias of the spring 77, there is provided a push rod 81 having a semi-spherical head 82 engaging in a conical socket 83 at the other end of the thickened portion 56 of the plunger. At its outer end, the push rod 81 is pivotally connected by a pin 84 to the lower end of a valve lever 85, by which an operating connection is made to the control mechanism described hereinafter. The lever 85 is pivoted intermediate its ends as at 86 on a supporting member 87, herein shown as a rod projecting rearwardly from the pump housing. A nut 88 threaded on the rod affords adjustment for the lever pivot fore-and-aft relative to the axis of the valve and for a purpose later to appear.

Provision is made for continuously oscillating the valve plunger 55 about its longitudinal axis to insure smooth and easy sliding of the plunger at all times. For this purpose the biasing spring 77 is housed in a cylinder 89 within which is received the square head 78 (see FIG. 8) of the push rod 79. Four grooves in the cylinder receive the corners of the head so that it can slide freely lengthwise of the cylinder but is nevertheless constrained to rock or oscillate with it about the cylinder axis. Restricted clearance is also thus afforded between the edges of the head 78 and the cylinder through which oil can flow to give a dash-pot effect for the plunger and thus damp movement of the valve plunger. The head 80 of the push rod provides a rotary driving connection whereby the valve plunger 55 is oscillated with the push rod upon oscillation of the cylinder. A snap ring 90 within the cylinder defines a fixed abutment for the spring 77. A second snap ring 90a at the opposite end of the cylinder catches the corners of the square head 78, holding it from emerging from the cylinder during assembly of the parts.

Figure 8:
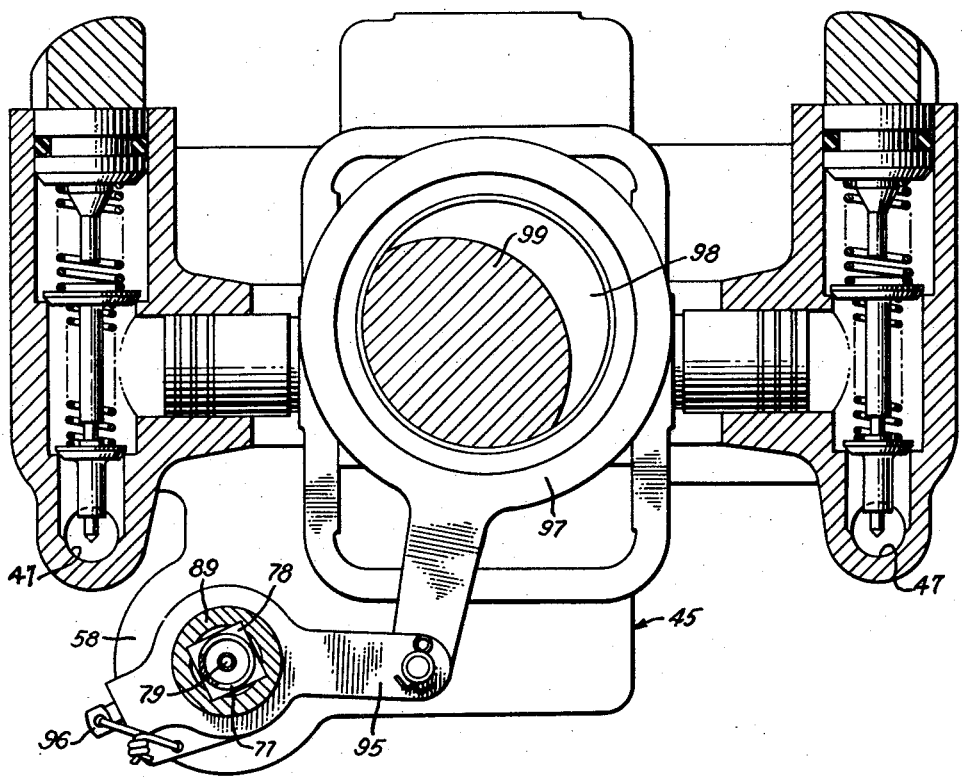
FIG. 8 is a fragmentary sectional view taken in a plane substantially on the line 8—8 of FIG. 7 showing details of the pump and valving.

As shown in FIGS. 7 and 8, the cylinder 89 is rotatably supported at one end in a recess 91 in the valve casing 57 concentric with the valve bore 57. At its other end the cylinder is likewise rotatably supported in a recess 92 in a boss 93 which may constitute a part of the pump housing or a part of a bracket rigidly attached to the housing. A snap ring 94 in the recess 92 takes the reaction of the cylinder 89. Interposed between the snap ring and the end of the cylinder is a disc 94a. The latter closes the cylinder end so that it may function as a dash-pot, as mentioned above.

The cylinder 89 and parts connected thereto are oscillated in timed relation to the rotation of the pump shaft by means of an arm 95 having an enlarged end portion apertured to receive the cylinder and non-rotatably secured thereto by suitable means such as a locking screw 96. At its other end, the arm 95 is pivotally connected with a connecting rod 97 which has a ring portion encircling one of the eccentrics 98 on the pump shaft 99. As the pump shaft rotates, the eccentric acts through the connecting rod to oscillate the arm 95 and cylinder 89, and such oscillations are transmitted by the push rod 79 to the valve plunger 55.

*Valve actuating mechanisms*

Having described a preferred embodiment of the valve mechanism itself, consideration may next be given to the illustrated mechanism for actuating it. It will be borne in mind, of course, that in so far as the broader aspects of the system are concerned, the illustrated pump and its valve mechanism constitute simply one of an available variety of mechanisms for supplying oil to (or exhausting it from) the system at variable rates.

Two types or sources of control action are present in the system, one manual, the other automatic. So far as the automatic aspect is concerned, soil reaction on the implement is measured by a control spring assembly on the tractor, force being applied to it through the top link 16 of the hitch. The preferred form of such assembly here shown is later described in detail. For the present suffice it to say that a linearly movable control member, herein shown as a push rod 131, passing beneath the rock shaft 40 (FIG. 1) is displaced axially in proportion to soil reaction (draft load) on the implement; and such displacement is utilized, as next described, to operate the valve mechanism V. Likewise, vertical positioning of the hitch linkage is automatically measured by the rotational position of an edge cam 120, fast in the rock shaft 40 and therefore always positioned in agreement with the draft links, and such cam is also utilized in operating the control valve.

So far as concerns manual adjustment or control, the driver uses the main quadrant lever 100, already identified (FIGS. 1, 2, 5 and 6). It is fixed on the outer end of a shaft 101 journaled in a hollow supporting arm 102, anchored in a recess in the center housing cover plate 26, as by a locking screw 103. A slotted sheet metal quadrant 104 serves as a guide for the lever. Stop bolts 105a and 105b constitute presettable stops at the ends of the quadrant slot. An adjustable stop with a knurled nut or knob 105 can be adjusted along the lower portion of the slot to aid the driver in returning the lever 100 to a setting which he has found desirable for a given implement in particular conditions.

Figure 4A:
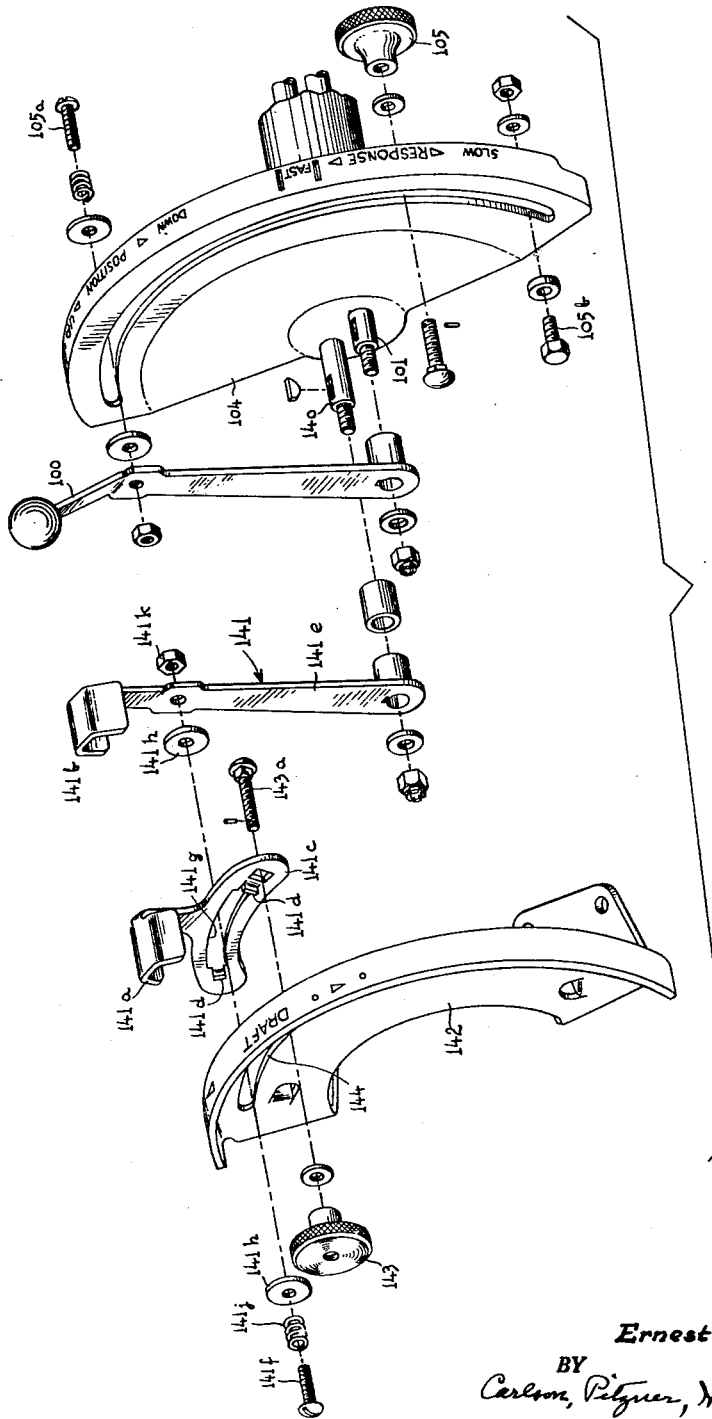
FIG. 4a is an exploded perspective view showing details of the manual operating elements of the controls.

Alongside the main quadrant is a second or auxiliary quadrant 142 slotted as at 144. Riding on this second quadrant is what may be termed a "depth setter," designated generally as 141. This depth setter has two sheet metal handles or finger pieces 141a and 141b. The first handle is integral with a slide 141c (FIG. 4a) of inverted T-shape having a pair of spaced tangs 141d guidingly received in the slot 144. A bolt 143a having a squared shoulder engaged in a complemental recess in the slide extends through the slot 144 for cooperation with a knurled nut or knob 143 which releasably secures the slide 141c in selected positions of adjustment to which it is moved by its finger piece 141a. The other finger piece 141b is fashioned on the end of a lever 141e non-rotatably fixed to the outer end of a shaft 140 (FIGS. 4 and 4a). A bolt 141f passing through the slot 144, an arcuate slot 141g in the slide 141c and an aperture in the lever 141e carries friction washers 141h disposed for engagement with the outer faces of the quadrant 142 and the slide 141c. A spring 141j interposed between the head of the bolt and the adjacent washer in cooperation with a jamb nut 141k threaded on the bolt serves to retain the lever 141e in frictional contact with the slide 141c.

To use the depth setter, the driver loosens the knob 143, grasps the pair of finger pieces 141a, 141b and slides them downward to a position corresponding to the working depth (actually draft load) which he requires for the implement. Then he retightens the knob 143. Should he wish to make some short-time field adjustment he grasps the finger piece 141b alone, pushing it up or down as required. Then to restore to the previous setting he has only to squeeze the finger pieces together, bringing the finger piece 141b back into registry with 141a.

The depth setter 141 is, in general, left at the working depth found best for the particular implement being used. The driver pulls up or lowers the main quadrant lever 100 to raise or lower the implement. Once in the soil the system will automatically retain the depth (draft load) fixed by the depth setter 141. Occassions for changing the setting of the latter are, of course, comparatively infrequent.

In considering the mechanism here illustrated for functionally interconnecting the valve mechanism V with these various manual and automatic sources of control modulation, it will be expedient first to trace the mechanical connections from quadrant lever 100 and position cam 120 by which the basic follow-up or position control action between quadrant lever and hitch links is effectuated. Then will be considered the connections from rod 131 and depth setter 141 by virtue of which the control is automatically switched over to modulation in accordance with draft requirements, when and if such action is required.

Looking first then to the position controlling aspects of the system it will be noted (see FIGS. 2, 5 and 6) that the main quadrant lever's shaft 101 has a radially projecting arm or eccentric portion 106 journaling a roller 107. The roller is positioned between a pair of jaws 108 and 109 formed on the end of a cam lever 110 pivotally connected as at 111 to the upper end of an intermediate valve actuating lever 112. The down-turned forward end 121 of the lever 110 is hooked over an eccentric 122, secured in selected position on the lever 112 by a locknut 122a.

The lever 112 is pivotally supported on a normally stationary pivot 113 with its lower end positioned in the path of a roller 114 mounted on the upper end of the valve lever 85. As herein shown, the lever 112 is guided in a slot 111′ (see also FIG. 2a) formed in a horizontally disposed web 112′ constituting a part of a bracket 113′ attached to and depending from one side of the ram cylinder 36. The action of the valve biasing spring 77 in urging the valve plunger 55 in a direction to swing the lever 85 clockwise (as viewed in the drawings) tends to rock the lever 112 counterclockwise and thus imposes a rearward bias on the cam lever 110.

As will be seen by reference to FIGS. 5 and 6 of the drawings, the lower edge of the cam lever jaw 108 is shaped to present a sloping cam surface 115 adapted to ride on a follower roller 116 carried by a rocker 117. The rocker is mounted to swing on a pivot shaft 118 supported on and extending across the upper part of the cover 26. A second follower roller 119 on the rocker 117 spaced rearwardly from the roller 116 coacts with the position control cam 120 fixed on the rock shaft 40. The cam 120 is shaped so that it swings the rocker forwardly as the hitch links are lowered and permits the rocker to swing rearwardly as links are raised.

With the above arrangement of the control elements, movement of the control lever 100 to its uppermost position as shown in FIG. 5, swings the cam lever 110 in a counterclockwise direction. Assuming that the hitch links 15 are in a lowered position, the cam 120 will be holding the rocker 117 forwardly and the cam surface 115 riding on the roller 116 will shift the cam lever 110 forwardly. This rocks the lever 112 clockwise and the lever 85 counterclockwise to shift the valve plunger 55 forward to "raise" position. The power operating system accordingly responds to raise the hitch. As the hitch links rise, the cam 120 turns in unison with the rise of the links and so that the rocker 117 and cam lever 110 move rearwardly. Accordingly, the valve plunger is progressively shifted toward and to its neutral position by the urging of its biasing spring 77. In this instance, the valve arrives at neutral as the hitch reaches the transport position.

To lower the hitch, the control lever 100 is swung downwardly from the position shown in FIG. 5. This raises the rear end of the cam lever 110 and allows the cam surface 115 to rise over the roller 116 as the cam lever moves rearwardly. Such rearward movement of the cam lever and the consequent rocking of the levers 112 and 85 permits the valve plunger 55 to shift toward the drop position. The control valve opens to exhaust fluid from the ram thus permitting the hitch to descend.

As the hitch descends, the cam 120 progressively shifts the cam lever and associated elements, including the valve plunger 55, toward the neutral position so as to interrupt the exhaust of fluid from the ram when the hitch reaches a position corresponding to the position to which the control lever 100 has been moved. Full lowering is accomplished when the lever is in approximately the position shown in FIG. 3. It will thus be seen that the hitch may be raised and lowered by swinging the control lever 100 through the upper portion of its range. The hitch follows precisely the movements of the control lever and comes to rest in a position corresponding to that in which the lever is stopped. Moreover, the movements of the hitch approximate the movements of the lever as to rate, so that the driver can raise or lower the hitch rapidly or slowly as desired and can, of course, stop the movement at any desired position.

Attention may next be given to the way draft control is caused to take over automatically when required. In the immediately preceding description of the actuating connections to the valve mechanism V no notice was taken of the depth setter 141. And the action described was that which would occur with the depth setter 141 set so low (for such a heavy draft load) that it is not reached during the actual working contemplated. It will now be assumed, however, that the depth setter has been moved up to a setting whose draft load will be, and is, encountered as an implement penetrates the soil.

The draft control portion of the mechanism, as best shown in FIGS. 2, 4 and 5a, comprises a rocker 130 mounted to swing on the pivot shaft 118 at one side of the rocker 117. The push rod 131, earlier identified, is pivotally connected to the rocker 130 by a pin 132. Inward movement of the push rod 131 under the influence of draft load on the hitch therefore swings the rocker forwardly.

Journaled on the rocker 130 preferably by the pin 132, is a follower roller 133 adapted to ride over a wedge or sloping cam surface 134 on a cam lever 135. This cam lever 135 is pivotally connected at its forward end at 135a to the upper end of a lever 136 which in turn is pivoted intermediate its ends on a normally stationary pivot 145a. The lever 136 is arranged alongside the lever 112 with its lower end guided in the slot 111′ (see FIG. 2a) and extending therethrough for cooperation with the roller 114 on the valve actuating lever 85. The spring bias on the lever 85 (from the spring 77) urges the lever 136 counterclockwise and thus biases the cam lever 135 rearwardly.

To provide for selectively determining the draft load to be maintained on the hitch, the cam lever 135 has a rearwardly extending finger portion 137 defining on its underside a cam surface 138 spaced above and disposed at an angle to the cam surface 134. Cooperating with the upper cam surface 138 is a roller 139 carried by an arm or eccentric on the shaft 140 which, in this instance, extends axially through the hollow supporting arm 102. Rocking of the shaft 140 by the depth setter 141 is thus effective to vary the position of the cam surface 134 with reference to the roller 133. Accordingly, the position in which the lever 136 intercepts the valve lever 85 may be selectively varied by using the depth setter to swing the cam lever 135 on its pivot. Thus, this adjustment determines the inwardly displaced position of the control rod 131 required to return the control valve plunger 55 to neutral position or, in other words, the draft load to be maintained on the hitch.

Provision is made for protecting the control system against damage in case the control lever 100 is swung more rapidly or violently than the power actuator can cause the hitch and attached implement to follow. For this purpose, the pivot 113, for the lever 112, is carried by a slidably supported rod 125 carried between spaced laterally projecting flanges 126 on the bracket 113′. A compression spring 127 interposed between one flange and the enlargement yieldably retains the rod and its pivot in the position shown in FIG. 5. When necessary, the spring permits forward movement of the rod in what may be called a "break out." As the actuator imparts the necessary movement to the hitch, the rod is gradually returned to normal position. Similarly the pivot 145a for the lever 136 is carried on a rod 145 slidably supported between the bracket flanges 126. A compression spring 146 urges the rod to the position shown in FIGS. 4 and 5a but permits it to move forwardly when required and return it to normal position when the load is relieved.

*Modifying control action for different implements*

Differences in implements require variations in the response characteristics of the system in order to realize satisfactory operation for all. For example, if the system is sensitive enough to respond adequately for a light cultivator, it will over-control so badly for a big three-bottom plow as to cause erratic and poor performance. Conversely, if the system is calculated for the heavy implement, a light one is substantially impotent in bringing about any control action. Heavy implements with light draft and vice versa extend the problem. The problem also becomes more acute as tractor power is increased, for with larger tractors, an increasingly wide range of implement sizes can, or rather should, be accommodated.

Those problems have been solved in the present system by a basically new approach. In substance, what is done is to interpose a positive stop for adjustably limiting the shift of the valve mechanism in the "drop" direction. Stated more fully, what is done is to provide first of all a control valving which dumps oil at a variable rate dependent upon the extent of motion imparted to it. That the valve mechanism V described above is such a one will already be appreciated. Then adjustable stop means is used to restrain or limit the maximum "drop" motion permitted to the valving.

Considered in terms of the specific valve mechanism V here shown, travel of the plunger 55 (FIG. 7) is adjustably limited in a leftward or drop direction. For a heavy three-bottom plow the limit is set so that at most only a portion of the narrow slots 74 can be uncovered when the draft controls call for a corrective lowering of the implement. Accordingly, even though the implement is very heavy and the oil thus expelled under high unit pressure, it will not over-control, will not dig too deep before the corrective lowering can be arrested. With a lighter implement the limiter is set to permit greater drop travel of the plunger 55 so that more of the length of the slots 74 can be uncovered, indeed, if desired some of the slots 75 can also be uncovered. Consequently, even though the lighter implement does impose a lesser unit pressure on the oil in the system (and hence will not cause oil to be expelled during "drop" at the same rate through an identic port area, as would the heavier implement) the enlargement of the available drop port area compensates. The volumetric rate at which oil is discharged for drop can thus be made substantially the same for all implements, whatever the weight and suck which they impose.

So far as concerns correction in implement position in a "raise" direction, the system response appears to be substantially uniform despite variation in loading on the hitch. The pump delivery rate, for a given intake port opening, is substantially unaffected by changes in oil pressure occasioned by differences in implement weight. Hence, adjustable limiting of valve travel in the "raise" direction does not appear to be requisite.

Having in mind then the sort of limiting action desired, it will more readily be appreciated that the presently disclosed mechanism affords it with a minimum of complication and in a manner readily at hand to the driver. It was earlier mentioned that the main quadrant lever 100 need only be moved down to the position of FIG. 3 for full lowering of the hitch. When pushed from there on down, the quadrant lever serves to diminish progressively the "drop" movement permitted to the valve plunger 55. If the driver finds a heavy plow is over-controlling, he has only to push the lever 100 down a little farther until the action eases up. From his point of view it is just as simple as that. And he sets the knob 105 so that he can readily return to the optimum setting he has thus ascertained for the implement.

As to what goes on inside the center housing, it will be seen upon reference to FIG. 3 that when the quadrant lever 100 is pushed on down from the position there indicated, it will lift the cam surface 115 from the path of the roller 116 and thus interrupt the coupling between the cam 120 and the valve actuating linkage. As herein shown, the cam lever 110 is formed with a hooklike element 121 at its forward end which is engageable with an adjustable eccentric 122 on the lever 112 as the cam lever swings beyond the position shown in FIG. 3. After such engagement, the cam lever 110 rocks the lever 112 about its pivot 113 during any subsequent further downward movement of the lever 100. Thus, further downward movement on the lever 100 swings the lower end of the lever 112 rearwardly so that it now serves as a stop or abutment to progressively restrict the movement of the valve plunger toward exhaust position. Maximum restriction of the exhaust through the control valve is, accordingly, obtained when the lever 100 is moved to its lower limit position, thereby blocking movement of the valve plunger beyond a position in which only small portions of the slots 74 are exposed to the pressure chamber of the valve. Minimum restriction of exhaust is available when the lever 110 first contacts the lever 112 (as in FIG. 3) for in that adjustment the valve plunger 55 can be actuated to its full exhaust position.

*Control spring assembly*

Reference has earlier been made to the fact that a control spring assembly is provided for measuring soil reaction on implements and displacing the push rod 131 in accordance with the measured reaction. The preferred form of such spring assembly appears in FIG. 1. Its construction and functioning will next be reviewed.

Desirably the control spring assembly is enclosed within a hollow, longitudinal rib or top extension 26a of the center housing cover plate 26. This extension terminates at its rearward end in a bifurcated portion presenting a pair of jaws 26b (see FIGS. 3a and 3b). Between these jaws is pivoted a rocker 25 on a pair of cap screws 24, one in each jaw, so that the rocker can swing freely on them fore and aft. The rocker 25 is U-shaped, extending forwardly within the confines of the jaws, and has two depending, integral legs 25a, one on each side and extending down from the pivot points afforded by the screws 24. Lying between the laterally offset lower portions of those legs 25a and extending forwardly from them, is a U-shaped yoke 27. Registering holes in the legs of the rocker and yoke respectively receive bushings 26c which pivotally connect the rocker and yoke together; and a removable coupling pin 21 passes through these bushed holes.

The top link 16 of the hitch can readily be attached to the rocker 25 and yoke 27 by the pin 21. For such purpose the forward end of the link with the apertured, swiveled ball 16a on it is simply dropped into the opening between the jaws 26b and the pin 21 is inserted (through the holes in the rocker and yoke legs and the swiveled ball on the link). Disconnection is equally easy, entailing simply withdrawal of the pin and lifting up the top link 16 (FIGS. 3a and 3b). By being able to drop the link in from the top, the maneuvering of tractor and implement in effecting a coupling is simplified.

On the forward portion of the yoke 27 is an integral, tubular head 27a (FIG. 3b), internally threaded to receive a control plunger 22. After being threaded into the head 27a the plunger is locked in place by a transverse pin 22a. At its forward end the plunger 22 has a head 22b with a peripheral flange 22c slidably received within a cup 28. The latter is internally flanged at its aft end to define an abutment engageable by the flange 22c upon rearward movement of the plunger. This cup is, in turn, slidable endwise within a bore 31 in the housing.

A heavy coil spring 29 encircles the control plunger 22. A collar 30, threaded in the housing, forms a stop for the spring when the latter is drawn rearward. The spring is heavy enough that its deflection under loads of the order of magnitude encountered in such an installation shifts the plunger only short distances. For example, in one installation a spring was used having a deflection from an unstressed condition of 0.13 inch with 1000 pounds of tension load applied and 0.39 inch deflection with 3000 pounds compression load, as illustrated in FIGS. 5a, 5b and 5c.

The push rod 131 heretofore referred to as imparting control motion in the system bears against the plunger head 22b. This rod is guidingly received in apertures in a flange on the housing cover plate 26 (FIG. 1) and in a closure plate 31a at the inner end of the bore 31. The spring bias (from spring 77 in the valve mechanism) acts through the system of levers and cams to urge the push rod 131 rearwardly into contact with the plunger head 22b. Accordingly, as the plunger 22 moves forward or back, under loading applied from the hitch, the push rod 131 will follow its motion and apply it to the rocker 130 for the purposes already described.

In earlier installations of the type here under consideration, a control spring was used which acted only in compression as, for example, in Ferguson U.S. Patent 2,118,180. As there described, soil reaction on the the bases of a plow attached to the hitch linkage tended to rock the implement forward about its pivotal connection to the lower draft links, thereby thrusting the top link forward. And that forward thrust was applied as compression on the control spring in measuring draft load for automatic control purposes. With attempts to use an ever increasing scope of implements it was found, however, that some implements were of such light draft as compared to the rearward tilting tendency which they have due to their weight, that even when under full draft they actually exerted a tension rather than compression load on the top link. Solution is described and claimed in U.S. Patent 2,437,875 of John Chambers and the present inventor, a double acting control spring installation being there disclosed in which variations in either tension or compression loading were utilized for control purposes.

The present installation is also one in which response is accomplished throughout a continuous range embracing both tension and compression; in short, the spring 29 is "double acting," or responsive to both positive and negative couple values imposed on the hitch. Thus when the top hitch link 16 is tensioned, the rocker 25 tends to swing rearward and drawing the plunger 22 and cup 28 rearward so that the spring 29 is compressed between the cup 28 and collar 30 as shown in FIG. 5a. Conversely, when compression is applied to the top link, the rocker 25 tends to swing forward and thrust the plunger 22 forward so that the spring 29 is compressed between the head 27a and the rear end of the cup 28 (the latter cup having gone solid against the partition 31a) as shown in FIG. 5b. The present installation has the advantage, however, that here, for the first time, it is possible to use a full range for such a double-acting spring. Neither false cycling during transport nor overload release settings diminish the range by reason of novel interrelations of the system components with the double acting spring and which are later explained.

In assembling the spring mechanism, the cup 28 and spring 29 are slipped onto the plunger 22. The collar 30 is loosely strung on the yoke head. The plunger is then screwed into the yoke head 27a, being tightened down just sufficiently to eliminate end play. When so tightened the locking pin 22a is inserted. Such parts are then slipped into the housing and the collar 30 screwed into place. The latter is screwed in wtih the depth setter 141 in its down position and just sufficiently to eliminate end play. A set screw (not shown) is then tightened to lock the collar 30.

A cup-shaped flexible rubber cover 32 may be provided to prevent entry of dirt and dust into the spring housing.

The rocker arrangement described is also particularly suited for obtaining most favorable action of the control spring under a wide range of conditions. Heretofore it has been customary to mount a bell crank rocker at 21a (FIG. 1) with the rocker pinned to a control plunger at the juncture of its arms and the top link pivoted to the rear end of the trailing arm of the bell crank. During use the top link must swing up and down. When an implement is digging deeply, it is well below horizontal, as shown in full lines in FIG. 3c, and in transport the top link is cocked upward from the horizontal, as shown in broken lines in that figure. With such previous form of rocker the rocker itself interposes substantial changes in the forces transmitted to the control spring. When swung either above or below horizontal, the rocker itself multiplied the load applied to the spring and it increased the multiplication progressively as the top link swung further from horizontal. Faulty control action resulted since the rocker gave a false interpretation of the forces being transmitted through the link. For example, in heavy going when the tractor's rear wheels slip they tend to dig in. But that lowering of the tractor is reflected in an upward swing of the top link. Consequently, the bell crank rocker (having a lessened mechanical advantage over the spring) relayed a message of lesser draft load, so the system tended to send the implement even deeper. Of course that is the very opposite of what was required to help the tractor at that point.

The presently disclosed rocker arrangement has the virtue that it minimizes its own intervention in the mechanical connections. It permits the top link and control spring to shift fore and aft, yet it does little to alter the effect of link load on the spring with changes in link position. For in the present arrangement the connection point 21 for links to spring assembly is also the point of rocker connection to spring assembly, so that no material alteration in the geometry of the connections results (see FIG. 3c).

*Overload release*

Provision is desirably made for abruptly relieving pressure in the system when a rock, stump or other fixed obstruction is hit. By so relieving the pressure, the implement theretofore "carried" on the column of oil in the ram 36 is dropped, and consequently the carried weight on the tractor is dropped. A sudden drop in carried weight permits the traction wheels to spin, and the momentum of the equipment is dissipated without further straining and tugging at the obstruction.

Such a general type of safety measure is afforded in the presently disclosed system. In doing so it follows certain general principles set forth in Ferguson U.S. Patent 2,118,181 in that draft overload causes the control valve to be moved clear through raise position and neutral into drop position. The advantage of the present arrangement, however, is that it affords effective protection throughout a range of control (and hence variety of implements) that has not been realized in any previous tractor.

The difficulties solved in providing overload release here come about in large measure from the fact that so long a range of control forces must be accommodated (for example, 1000 lbs. tension on the control spring to 3000 lbs. compression) plus the fact that transition takes place between a position type of control and a draft type of control. As to the latter, overload must essentially be measured in terms of draft. So the overload release has, somehow, to be made effective at all times whether the system is currently set or not to operate in draft control. As to the former, it should be borne in mind that overload release arrangements currently used and for some years (the present "Ferguson" tractor and the earlier "Ford-Ferguson" tractor) gave relief upon application to a fixed, top draft load. No matter what the implement, they relieved at a fixed top value. The actual usable range of the control spring employed was diminished. The protection afforded light draft implements was impaired.

The present overload release system does not give relief simply at a fixed value. Instead there is here correlated with the long-range draft control mechanism (responsive to changes in both tension and compression in the top link) an overload release that relieves the pressure in the system whenever there is a fixed increment of excess in draft over the particular setting prevailing for draft control. For example, if the range set for draft control is 4000 lbs. (1000 tension and 3000 compression on the top link) the depth setter can be set for draft anywhere in that range and overload release will take place when, but only when, the draft jumps a fixed increment above that setting. Accordingly, light draft implements (or heavy draft implements which impose only a lesser thrust on the top link because of the counterbalancing of their own heavy overhanging weight) are fully protected. They are not required to withstand shocks of overloading up to some top figure suitable for a heavy draft implement, before the release becomes effective.

Figure 9:
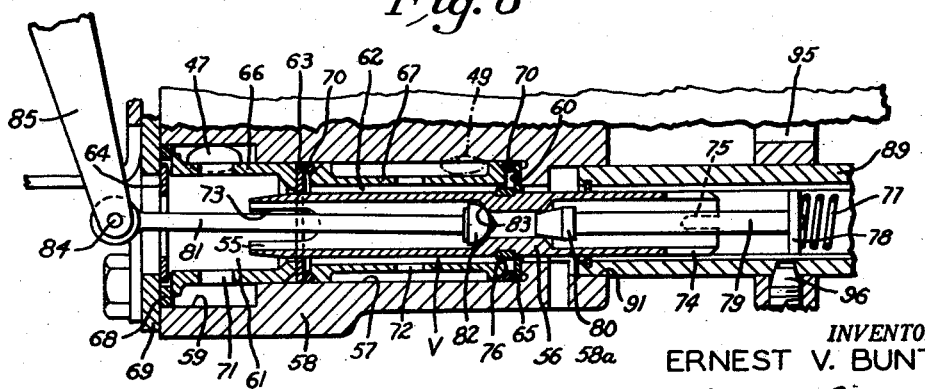
FIG. 9 is a stop-motion view (in longitudinal section) of the valve mechanism when in its overload release position.

Turning now to the particular embodiment here shown, it will be observed that when valve plunger 55 is moved forward through its raise position it finally reaches the limit position of FIG. 9. In such position the wide slots 73, which heretofore have served as intake slots, have now moved beyond the central ring 63 into the high pressure chamber. Accordingly, in such position pressure in the system is relieved through them to the sump.

Draft load, exceeding by a fixed increment the setting of the depth setter 141, brings about precisely such a shift of the valve plunger 55. Alteration in the depth setter position changes the displacement of the rod 131 required to shift the plunger to raise position, just as heretofore described. The further down the depth setter is pushed, the further inward the rod 131 must be thrust before the plunger reaches raise position. Likewise, the further down the depth setter 141 is pushed the further forward the rod 131 must be thrust (heavier draft load) before the valve plunger 55 is moved not only to raise position but on through to the overload release position required. Accordingly, the desired proportionality is accomplished.

Moreover, the overload protection is always available whether or not the system be operating at the time in what amounts to actual position control. For example, if the quadrant lever 100 is high enough relative to the position of the depth setter 141 that no draft control action is taking place, nevertheless, if an obstruction is hit the resultant swing of the lever 136 (FIG. 4) will lift the roller 114 off of the companion lever 112 and open the control valve for dumping the system. Reference to FIG. 2a will show that the slot for lever 136 is made longer than that for lever 112 to accommodate just such action. The slot for lever 112 being shorter, it cannot move the plunger 55 to overload release position, so danger of its doing so is avoided when the main quadrant lever 100 is swung upwardly more rapidly than the system can follow. Under such conditions, the spring 127 will permit the pivot of the lever 112 to move forwardly in a break out action.

*Initial adjustments*

In assembling and initially adjusting the system various procedures and adjustments may be followed. One suitable in assembly of the control spring assembly has already been described. Turning then to other adjustments which are afforded, the following may be noted.

In adjusting the parts participating in position control or follower-up action, the first step is to swing the quadran lever 100 to the end of its initial or lowering range. That is approximately the position of FIG. 3 and suitable marks or legends may desirably be placed in the quadrant to locate it, as shown in FIG. 4a. The lift arms 41 are likewise located in their fully lowered position. Then the nut 125a (FIG. 6) on rod 125 is adjusted until the lever 112 is held just free of the right hand end of the slot 111' against a force equal to that applied to it by the valve bias spring 77, a poundage that can be readily measured, especially since the ratio of lever 85 is substantially 1 to 1. Then the eccentric 122 is rotated into firm contact with the hooked nose of the cam 110 and the locknut 122a tightened to hold it in such position.

In order to adjust the position of the lever 136, which is companion to the lever 112 (cf. FIG. 2), the depth selector 141 is swung downward to a position preferably located by marks or legends on the quadrant 142 (see FIG. 4a) established to define the desired range of control in tension (in an upward direction) and the desired range in compression (in a downward direction). A position approximating that in FIG. 4 is suitable. Then the nut 145b is adjusted (FIG. 4) to vary the position of the pivot 145a until the lever 136 is held just free of the forward end of the slot 111' against a force equal to that applied to it from the valve bias spring 77.

The foregoing adjustments may be made most conveniently before the cover plate 26 and control elements carried thereby are assembled with the tractor. After assembly with the tractor, and with those control elements adjusted as above described, self-locking nut 88 is adjusted to position lever 85 so that roller 114 lightly contacts the lower ends of levers 112 and 136 with the valve V at full discharge as shown in FIG. 7.

With the sump filled with oil and the tractor engine running, adjustments may now be made for transport shut-off position and minimum discharge orifice opening. To this end, lever 100 may be moved upwardly until the following action of the left arms 41 achieve a predetermined position. Stop bolt 105a is then moved rearwardly against the lever 100 and locked in place. This marks transport position.

Moving lever 100 downwardly beyond its position control range, that is, below that shown in FIG. 3 to the lowest possible position, shifts the valve plunger 55 into a limited intake position. The draft links will now rise (due to the operation of the pump 45). With the links in an intermediate position and loaded with a prescribed weight, the lever 100 is moved upwardly until the intake port is closed and the discharge slots are opened sufficiently to allow the links and weight to lower very slowly. Stop bolt 105b and adjustable stop 105 are moved into contact with the edge of the control lever. The stop bolt is then locked in place.

*Implement transport*

In moving from one place of work to another an implement carried by the hitch links 15, 16 should be held up clear of the ground in so-called transport or fully elevated position. With all of its virtues in extending control range, a double-acting control spring, such as described, introduces difficulties in that regard. For the hanging weight of an implement suspended on the linkage in transport inevitably deflects such a control spring in tension. And that will bring about false cycling of the hydraulic system if it be of the draft type of Ferguson U.S. Patent 2,118,180. Even if the dead weight of the implement does not do so, the changes in loading will, which comes from going over bumpy ground.

In contrast, the present arrangement is such that a transported implement rides easily, cushioned by the control spring itself, and without any tendency to cause false cycling of the system.

To see why that happens it should be observed by way of contrast that in a system like that of Ferguson U.S. Patent 2,118,180, emergence of the ram piston from its cylinder is used to rock the valve lever to neutral and thus effect transport cut-off. Accordingly, any displacement of the control plunger outward will rock the valve lever away from neutral and restart the system. And as soon as a double-acting control spring is applied that will happen with a transported implement. But not so here. For in the present arrangement whatever happens to the load on the control spring has no effect until the loading exceeds the value fixed by the depth setter 141. When the main lever 100 is pulled up to hoist an implement to transport the system goes to neutral when the hitch reaches the height fixed by that lever. The depth setter is well down. And tensioning load on the control spring will not restart the system.

Not only is the system in such case immune to false cycling but the control spring 29 itself can and does serve a wholly new purpose. It becomes a support spring for the suspended implement. That smooths the ride and resists the tendency of a heavy implement, when so suspended, to lift the tractor's front end. The hydraulic system is also protected in another respect by spring supporting such carried implements. For lacking such a spring suspension, the jouncing of heavy equipment over rough ground causes carried implements to impose shock loads on the column of oil in the ram cylinder with consequent blowing of the relief valve and eventual damage to it. Full protection from such action is afforded by the present arrangement.

*Auxiliaries*

The presently disclosed system is well suited to accommodate hydraulic auxiliary devices. For an example of such auxiliary hydraulic equipment as is contemplated see Nelson U.S. Patent No. 2,658,635. Such auxiliaries commonly require one or more hydraulic actuator cylinders.

To supply such an auxiliary from the main pump 45 of the present system, a supply line to the auxiliary may conveniently be connected to cross passage 51a (FIGS. 1 and 3a) in the housing below a removable plate 50 bolted to the top of the center housing. Such plate, with its cored passages, is made removable so that it can be replaced, if desired, with other plates having valves, manifolding or the like for various auxiliaries. Absent such refinements, however, the connection may be made to passage 51a by unscrewing a plug 51b (FIG. 3a) from its end and screwing in the coupling for an auxiliary line. Direct connection is thus afforded from the pump's discharge line 48.

Such an implement as the manure loader of the Nelson patent mentioned above can be readily supplied, and to considerably better advantage that with previous systems. The functioning is superior in that necessity for providing a separate dump line, by-passing the restricted drop ports of the main valve in older systems, is avoided. In the present system the drop ports or slots 74 and 75 afford such a large maximum area that quick lowering of even a light, empty fork is accommodated.

Moreover, the controls of the present system give easy manipulation of an auxiliary. And there is no necessity for blocking the hitch links at some position short of transport cut-off in order to excite the system as was done, for example, in Chambers U.S. Patent No. 2,592,393. With an auxiliary line connected to passage 51a, the driver may first locate the main quadrant lever 100 at the lower end of its normal positioning range (FIG. 3). The valve plunger 55 thereupon goes to full drop position and the hitch links 15 drop loosely. Then the driver eases up on the depth setter 141 and as a consequence of which the valve is shifted to "raise" position. Thereupon oil is delivered from the pump.

Such delivery of oil will cause a raising of either the main ram 36 and then the auxiliary, or vice versa, the one to move first being the one most lightly loaded since the two are in parallel in the circuit. Assuming the links are the first to rise, as they usually would be if no implement was on them, they go on up until their rise is blocked by the arm 39 striking the inner top portion of the center housing. Then the auxiliary actuator executes its rise. On completion of the latter, the driver eases the depth setter 141 back down. This causes the valve plunger 55 to move from raise to drop position so that the auxiliary lowers again. Moreover, the lowering of the auxiliary takes place by exhausting oil through the passage 51a and line 48 and the main valve V so no separate return line is required.

To take advantage of a maximum amount of the large drop port area afforded for the plunger 55, the quadrant lever 100 will be set at the lower end of its position control range (FIG. 3) as just described. Most rapid drop of the auxiliary is effected in such case. The auxiliary can, moreover, be operated with the quadrant lever 100 in any part of its range above its lowermost position-control setting. In such case the depth setter 141 may be used just as described above and the same cycle accomplished except that lowering of the auxiliary may take place at a slower rate.

*Résumé of operation*

Details of structure and operation will by now be clear. A brief recapitulation will, however, be useful in understanding the overall operation, particularly from the point of view of the farmer who uses such a tractor.

Be it assumed that the tractor has its system adjusted and ready for operation. The driver backs it up to a selected implement, for example a plow. He couples it to the hitch links 15, 16 with the three studs provided on the implement. He then has only to pull up the quadrant lever 100 to raise the plow into transport position. It rises to the height fixed by his lever. When there the rise automatically stops. No more oil is pumped even though the pump is running continuously.

He drives to the field to be worked. The depth setter 141 is put at about the setting he thinks will be suitable. Then he swings the quadrant lever 100 downward, lowering the plow. He watches the plow as it furrows, adjusts the depth setter 141 to get the furrow depth he wishes and tightens the knob 143 to fix that point of sequence. If the system seems to be over-controlling, detected by vibration of the equipment and the seat he is on, he eases down the quadrant lever 100 until the vibration stops. Such roughness is usually due to an implement lowering too rapidly in the system's corrective adjustment of its depth. The heavier the implement, the farther down the quadrant lever will need to go. Having a satisfactory setting, he locates it with the knob 105.

At the end of the furrow he raises the quadrant lever 100, lifting the implement effortlessly so far as the driver is concerned, and wheels about to drive to his next starting point. For dropping the plow for his next furrow he lowers the quadrant lever 100 to the position already fixed by knob 105. The depth setter 141 has remained just where it was so it is ready to do its work.

As he goes along, the general impression is that the implement goes wherever he puts it with the quadrant lever 100. However, if he really did have a true follow-up or position control system, the plow would not do so. For in such case, as the tractor pitched and bucked going over the field the furrow depth would be most irregular. But what has happened in the present tractor is, of course, that the draft control has silently taken over once the implement is in the ground and is automatically retaining furrow depth despite uneven ground contour. Tractor and implement have complete freedom to jackknife up or down in a loose-jointed way and yet control is retained.

Perhaps he chooses not a plow but a subsoiler. It is peculiar in that it has very heavy draft but relatively light weight. To get it to sink into the ground rapidly, despite its lighter weight, he lowers the quadrant lever 100 rapidly to stay ahead of the hitch links and no farther than the end of its positioning range so as to have the drop ports 74, 75 wide open to get rapid penetration. Then he eases it further on down to decrease the sensitivity of response after the subsoiler is at full depth and at which time the suck of the implement has caused a very large transfer of load to the tractor.

Should he be operating a crane or loader on the hitch links, it can be raised and lowered simply with the quadrant lever 100 and will follow with fidelity the motions of that lever. His ability to open the valve wide for quick dump of oil during such operations insures fast response despite the fact that the same valve bleeds only carefully controlled amounts when the operator moves the lever slowly.

I claim as my invention:

1. In a power operating system for a tractor-borne implement hitch, in combination, a pressure fluid operated actuator for raising and lowering the hitch, shiftable valve means controlling said actuator, valve shifting means including a member shiftable in conformity to the position of the hitch, a first lever pivoted intermediate its ends on a stationary support and having one end operatively connected with said valve means, a second lever pivoted intermediate its ends adjacent the end of said first lever remote from the end connected to the valve means, said second lever having a cam surface at one end disposed in inclined relation to the path of said shiftable member for engagement thereby, and manually operable means for rocking said second lever on its pivot to present selected points on said cam surface for engagement by said shiftable member.

2. In a power operating system for a tractor-borne implement hitch, the combination with a pressure fluid operated actuator for raising and lowering the hitch, shiftable valve means controlling the operation of said actuator, a first lever pivoted intermediate its ends and on a stationary support, said lever having one end operatively connected with said valve means, spring means biasing said valve means and said one lever in one direction, a second lever pivoted intermediate its ends on another stationary support, said second lever having one end positioned to intercept the end of said first lever remote from its connection with the valve means, a third lever pivoted intermediate its ends on said other support alongside said second lever and having one end positioned to intercept the remote end of said first lever, means connected to the end of said second lever remote from its intercepting end for swinging it on its pivot in response to changes in the draft load on the hitch, and means connected to the corresponding end of said third lever for swinging it about its pivot in response to positional changes of the hitch.

3. In a power operating system for a tractor-borne draft linkage, the combination with a pressure fluid operated actuator operative to raise or lower the linkage, of valve mechanism shiftable in opposite directions from a neutral position to respectively control the supply of fluid to and exhaust of fluid from said actuator, a control member adapted to be displaced progressively in proportion to the draft load imposed on the draft linkage, means for shifting said valve mechanism in response to displacement of said control member including a follower element movable by said control member, a cam lever operatively connected with said valve mechanism and supported for movement toward and from said follower element and transversely of the element, said lever presenting a cam surface inclined to the path of said follower element and engageable thereby to shift the lever in response to movements of the element, and manually operable means for shifting said cam lever transversely of the path of said follower element to determine the point on said cam surface presented for engagement by said element whereby to selectively vary the extent of movement of the element required to shift the valve mechanism to neutral position.

4. A linkage for transmitting the movements of a linearly movable control member to a movable valve member comprising, in combination, an actuating lever pivoted intermediate its ends and having one end operatively connected to said valve member, a cam lever pivoted on the other end of said lever and presenting a cam surface disposed in inclined relation to the path of movement of the control member and in a position to be engaged thereby, and means for rocking said cam lever about its pivot to selectively determine the point on said cam surface engaged by said control member whereby to vary the effective length of the linkage.

5. Valve actuating mechanism comprising, in combination, a first lever pivoted intermediate its ends on a stationary supporting member and having an operative connection at one end with the valve to be actuated, a second lever pivoted intermediate its ends on the end of said first lever remote from its connection with the valve, means engageable with one end of said second lever for shifting the same generally endwise to rock said first lever about its pivot, means for rocking said second lever about its pivot, said second lever having an extension at its other end engageable with an abutment on said first lever when the second lever is rocked to a predetermined position, said extension cooperating with said abutment to cause said levers to swing as a unit about the pivot of said first lever when the second lever is rocked beyond said predetermined position.

6. In a power operating system for a tractor-borne implement hitch including a power operated actuator for raising and lowering the hitch, the combination with control means for said power operated means, of a member variably positioned in accordance with the draft load on the hitch, a linkage interposed between said member and said control means for positioning the latter in response to movement of said member to cause said actuator to raise or lower the hitch and thereby maintain the draft load on the hitch substantially constant, and means for varying the effective length of said linkage to selectively determine the draft load to be maintained on the hitch including a lever and slide assembly pivoted to swing about an axis adjacent one end of the lever, a quadrant coacting with said slide to guide it in its movements with the lever in the initial adjustment of the linkage, and means for locking said slide in a fixed position of adjustment, said lever having limited motion relative to the slide to effect secondary adjustments of said linkage.

7. In a tractor having a vertically swingable implement hitch and a power unit for raising and lowering the hitch, control means responsive to the draft load on the hitch for causing the power unit to raise or lower the hitch to maintain the draft load substantially constant, means for adjusting said control means to select the particular draft load to be maintained on the hitch, and means operative when the draft load exceeds said selected load by a predetermined increment that is substantially the same for all selected draft loads for causing the power unit to drop the hitch.

8. In a power operating system for a tractor-borne implement hitch linkage, in combination, a hydraulic actuator operatively connected to the linkage for raising and lowering the same, means responsive to the position of the linkage controlling said actuator when the attached implement is above a predetermined working depth, other means responsive to the draft load on the attached implement automatically conditioned for controlling said actuator when the implement is in the vicinity of said predetermined working depth, and safety release means for disabling said actuator in response to a fixed increase in draft load on the attached implement above that selected by said other means which increment is substantially the same for all selected draft loads.

9. In a control system for a tractor's implement hitch, the combination with a control lever, of power means for causing the hitch to follow the movements of said lever in raising or lowering an implement attached to the hitch, means responsive to the draft load on the hitch for causing said power means to correctively raise or lower the hitch and attached implement so as to maintain a substantially constant draft load on the hitch after the implement has been lowered to working position by said lever, said draft responsive means being adjustable to vary the value of the constant draft load, and means operative upon an increase in the draft load over the load for which said draft responsive means is adjusted by an increment which is substantially the same for all adjusted loads for causing said power means to drop the hitch and attached implement.

10. In a tractor having means for attachment of an agricultural implement and a power operated unit for raising and lowering the implement with reference to the tractor, the combination of control means for said unit including a member controlled by the draft load on the tractor for causing said unit to raise or lower the implement to maintain the draft load substantially constant, adjusting means in said control means settable manually to select the value of the draft load to be maintained, said member being further operative when the draft load exceeds the selected value by a predetermined increment that is substantially the same for all selected loads for causing power unit to drop the implement.

11. In a tractor having a vertically swingable implement hitch and a power unit for raising and lowering the hitch, control means responsive to the draft load on the hitch for causing the power unit to raise the hitch or to lower it at a restricted rate to maintain the draft load substantially constant, means for adjusting said control means to select the particular draft load to be maintained on the hitch, and said control means being operative when the draft load on the hitch exceeds said selected draft load by a predetermined increment which is substantially the same for all selected loads for causing the power unit to lower the hitch at a substantially unrestricted rate.

12. In a tractor having a vertically swingable implement hitch and a power unit for raising and lowering the hitch, the combination of control means responsive to the draft load on the hitch for causing the power unit to raise or lower the hitch to maintain the draft load substantially constant, safety release means operable in response to an excessive draft load for causing the power unit to drop the hitch, and means for adjusting said control means to select the particular draft load to be maintained on the hitch and to correspondingly vary the load at which said release means becomes operative.

13. In a control system for a tractor having a trailing implement hitch and a hydraulic actuator means for raising and lowering such hitch and an implement mounted thereon, the combination of a constant delivery pump driven continuously by the engine of the tractor and having an inlet and an outlet, conduit means for delivering pressure from said pump outlet to the actuator means, valve means operable to throttle said pump inlet and thereby control the volumetric delivery of said pressure fluid to said actuator means irrespective of variations in the pump speed, a first control means including a first control member, means connecting said member to the hitch operative to shift the member in conformity with the position of the hitch, a second control member, a hand lever mounted on the tractor operable to selectively position said second control member, said first and second control members being coupled for cooperatively shifting said valve means to effect a follow-up action on the hitch for raising and lowering the same in conformity with the position of said lever, other control means including a third control member, means for setting said third member in a position to designate a predetermined draft load to be maintained on the hitch, a fourth control member adapted to be displaced in proportion to the draft load on the hitch, said third and fourth control members being coupled for cooperatively shifting said valve to override said first control means when said predetermined draft load is imposed on the hitch and to thereafter cause a corrective raising or lowering of the hitch in a manner to retain a substantially constant draft load on the same.

14. In a control system for a tractor having a trailing hitch adapted for connection with implements of widely differing weights and power operated means for raising and lowering the hitch and attached implement, means controlling the power supply to said power operated means, a first control member movable in unison with the hitch as it is raised or lowered, a member settable selectively by a lever pivotally mounted on the tractor, said first control member cooperating with said settable member to actuate said power controlling means to control said power operated means to cause the hitch and implement to follow the movements of the lever, a control member adapted to be shifted responsive to changes in the draft load on the hitch, and manually settable means cooperating with said draft responsive control member for actuating said controlling means to control said power operated means for imparting corrective movements to the hitch in a raising or lowering direction to retain a substantially constant draft load on the hitch at a value determined by said manually settable means, said manually settable member including means adjustable manually to limit the corrective movement of the hitch in a lowering direction to a rate that is substantially the same for implements of different weight.

15. In a control system for a tractor having a vertically swingable implement hitch and a hydraulically operated actuator means for raising and lowering the hitch and an attached implement, a shiftable valve for controlling the delivery of pressure fluid to and exhaust of fluid from said actuator means, a pair of manually adjustable levers pivotally mounted on the tractor, a linkage system connecting each lever for selectively positioning said valve, one linkage system including an element variably positioned in accordance with the draft load imposed on the hitch, the other linkage system including an element shiftable in accordance with the position of the hitch, said linkage systems each being connected to said valve so that either is operative to shift said valve in a direction to cause said actuator means to raise the hitch regardless of the setting of the other linkage system by its associated lever, the lever acting through said other linkage system having an extended range of manual adjustment wherein the rate response of the sctuator means to the shifting of the valve by said one linkage system may be adjusted.

16. In a control system for a tractor having a vertically swingable implement hitch and a hydraulic actuator means for raising and lowering the hitch, the combination of a control spring adapted to operate under tension and compression forces, draft responsive control means including a member shiftable in proportion to the draft load on the hitch against the force of said control spring, said control spring opposing both tension and compression forces imposed on the hitch by an implement attached thereto, a valve controlling the flow of pressure fluid to and from said actuator means, a linkage interposed between said control member and said valve by which the valve is shifted to cause said actuator means to raise or lower the hitch, means for manually adjusting the linkage to adapt it to respond to different draft loads, hand lever actuated means operable to shift said valve for causing elevation of the hitch and attached implement into a transport position wherein the control spring mechanically supports the hitch and implement, said linkage when adjusted for a substantial draft load being operative to prevent shifting of said valve by said draft responsive control means when the hitch is in transport position and thereby preclude false cycling of the actuator means induced by bounce of the hitch and the attached implement as the tractor is driven over rough ground.

17. In a control system for a tractor having a vertically swingable implement hitch, the combination of draft-responsive control means for raising and lowering the hitch to maintain the couple value on the hitch substantially constant, said draft-responsive control means including a double acting spring responsive to both positive and negative couple values imposed on the hitch, power operated actuator means operatively connected with the implement hitch, means for manually adjusting said draft-responsive control means to selectively determine the couple value to be maintained on the hitch, second control means including manually settable means, said second control means being responsive to position of the hitch and operative to control said actuator means for raising and lowering the hitch through a range of positions above the position otherwise determined by the draft-responsive control means, said second control means acting when said manually settable means is set for highest elevation of the hitch to cause the actuator means to maintain the hitch at its upper limit of travel while permitting the weight of an overhanging implement to be directly cushioned by the double acting spring.

18. In a control system for a tractor having a vertically swingable implement hitch, a hydraulic actuator means for raising and lowering said hitch, said actuator means including a pump, a valve controlling the flow of pressure fluid to said pump, draft-responsive means including an element movable in response to changes in the draft imposed on the hitch, a first motion transmitting linkage operatively connected with said element and including a member shiftable by a hand lever to adjust the effective length of said first motion transmitting linkage, position responsive mechanism including an element movable in unison with the hitch, a second motion transmitting linkage operatively connected with said last-mentioned element including a member shiftable by a hand lever to adjust the effective length of said last-mentioned linkage, a valve actuating lever interposed between said valve and said first and second motion transmitting linkages, both linkages acting on said valve through said valve actuating lever with the linkage having the longer effective length exercising control of the valve.

References Cited in the file of this patent

UNITED STATES PATENTS

| | | |
|---|---|---|
| 1,760,347 | Craig | May 27, 1930 |
| 2,018,375 | McCants | Oct. 22, 1935 |
| 2,076,306 | Weeks | Apr. 6, 1937 |
| 2,348,265 | Rippingille | May 9, 1944 |
| 2,353,467 | Hennessy | July 11, 1944 |
| 2,385,664 | Warner | Sept. 25, 1945 |
| 2,437,875 | Chambers et al. | Mar. 16, 1948 |
| 2,586,390 | Schumaier | Feb. 19, 1952 |
| 2,611,306 | Strehlow et al. | Sept. 23, 1952 |
| 2,631,514 | Roeder | Mar. 17, 1953 |
| 2,631,515 | McRae | Mar. 17, 1953 |
| 2,659,286 | Metzger | Nov. 17, 1953 |
| 2,679,199 | Strehlow | May 25, 1954 |
| 2,691,929 | Grimshaw | Oct. 19, 1954 |
| 2,715,863 | Bunting | Aug. 23, 1955 |
| 2,887,165 | Heitshu et al. | May 19, 1959 |
| 2,887,167 | Heitshu et al. | May 19, 1959 |